(12) United States Patent
Kim et al.

(10) Patent No.: US 12,473,440 B2
(45) Date of Patent: Nov. 18, 2025

(54) INK COMPOSITION AND DISPLAY APPARATUS INCLUDING LAYER CONTAINING THE INK COMPOSITION

(71) Applicant: Samsung Display Co., Ltd., Yongin-si (KR)

(72) Inventors: Soodong Kim, Yongin-si (KR); Minseok Kim, Yongin-si (KR); Sujin Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 782 days.

(21) Appl. No.: 17/745,894

(22) Filed: May 17, 2022

(65) Prior Publication Data

US 2023/0159770 A1 May 25, 2023

(30) Foreign Application Priority Data

Sep. 30, 2021 (KR) .................. 10-2021-0130283

(51) Int. Cl.
| | | |
|---|---|---|
| *C09D 11/02* | (2014.01) | |
| *C08F 10/02* | (2006.01) | |
| *C08F 20/06* | (2006.01) | |
| *C08F 222/10* | (2006.01) | |
| *C08K 3/22* | (2006.01) | |
| *C09D 11/03* | (2014.01) | |
| *C09D 11/037* | (2014.01) | |
| *C09D 11/10* | (2014.01) | |
| *C09D 11/101* | (2014.01) | |
| *C09D 11/322* | (2014.01) | |
| *C09D 11/326* | (2014.01) | |
| *C09D 11/36* | (2014.01) | |
| *C09D 11/38* | (2014.01) | |
| *C09D 11/50* | (2014.01) | |
| *C09K 11/06* | (2006.01) | |
| *C09K 11/56* | (2006.01) | |
| *C09K 11/70* | (2006.01) | |
| *G02F 1/13357* | (2006.01) | |
| *H10K 59/38* | (2023.01) | |

(52) U.S. Cl.
CPC ............ *C09D 11/02* (2013.01); *C08F 10/02* (2013.01); *C08F 20/06* (2013.01); *C08K 3/22* (2013.01); *C09D 11/03* (2013.01); *C09D 11/037* (2013.01); *C09D 11/10* (2013.01); *C09D 11/101* (2013.01); *C09D 11/322* (2013.01); *C09D 11/326* (2013.01); *C09D 11/36* (2013.01); *C09D 11/38* (2013.01); *C09D 11/50* (2013.01); *C09K 11/06* (2013.01); *C09K 11/565* (2013.01); *C09K 11/70* (2013.01); *G02F 1/133606* (2013.01); *H10K 59/38* (2023.02); *C08F 222/102* (2020.02); *C08K 2003/2227* (2013.01); *C08K 2003/2237* (2013.01); *C08K 2003/2286* (2013.01)

(58) Field of Classification Search
CPC ......... C09D 11/02; C09D 11/36; C09D 11/10; C09D 11/101; C09D 11/322; C09D 11/326; C09D 11/38; C09D 11/03; C09D 11/037; C09D 11/50; C09K 11/06; C09K 11/565; C09K 11/70; C08F 20/06; C08F 10/02; C08F 222/102; C08K 3/22; C08K 2003/2237; C08K 2003/2286; C08K 2003/2227; G02F 1/133606; H10K 59/38
See application file for complete search history.

(56) References Cited

U.S. PATENT DOCUMENTS

| | | | |
|---|---|---|---|
| 6,977,704 B2 * | 12/2005 | Kataoka | ................ G02F 1/1337 349/136 |
| 9,465,145 B2 | 10/2016 | Coggio et al. | |
| 10,892,309 B2 | 1/2021 | Kim et al. | |
| 11,036,087 B2 | 6/2021 | Lee et al. | |
| 11,650,363 B2 | 5/2023 | Lee et al. | |
| 2016/0254405 A1 * | 9/2016 | Ueda | ....................... H02S 40/22 136/247 |
| 2019/0207132 A1 * | 7/2019 | Park | ..................... H10K 50/805 |
| 2021/0135141 A1 | 5/2021 | Park et al. | |
| 2021/0382352 A1 | 12/2021 | Kim et al. | |

FOREIGN PATENT DOCUMENTS

| | | |
|---|---|---|
| EP | 3923340 | 12/2021 |
| JP | 2007114563 A * | 5/2007 |
| JP | 2009139465 A * | 6/2009 |
| JP | 5102958 | 12/2012 |
| JP | 2013-254093 | 12/2013 |
| KR | 10-2020-0122466 | 1/2010 |
| KR | 10-2013-0129940 | 11/2013 |
| KR | 10-1347176 | 1/2014 |
| KR | 10-2019-0066109 | 6/2019 |
| KR | 10-2020-0014450 | 2/2020 |
| KR | 10-2020-0032294 | 3/2020 |

OTHER PUBLICATIONS

Machine English translation of JP 2007-114563, Kawakami et al., May 10, 2007.*
Machine English translation of JP 2009-139465, Kunieda, Jun. 25, 2009.*
Korean Notice of Allowance for Korean Patent Application No. 10-2021-0130283, dated Jun. 18, 2024.

* cited by examiner

*Primary Examiner* — Patrick D Niland
(74) *Attorney, Agent, or Firm* — CANTOR COLBURN LLP

(57) ABSTRACT

An ink composition and a display apparatus including a layer and that is formed using the ink composition. The ink composition includes a scatterer, a monomer, and a dispersant. The layer formed using the ink composition has a refractive index of about 1.1 to about 1.5. A lateral luminance of the display apparatus is improved as a result thereof.

19 Claims, 9 Drawing Sheets

INK COMPOSITION AND DISPLAY APPARATUS INCLUDING LAYER CONTAINING THE INK COMPOSITION

CROSS-REFERENCE TO RELATED APPLICATION

This application claims priority from and the benefit of Korean Patent Application No. 10-2021-0130283, filed on Sep. 30, 2021, which is hereby incorporated by reference for all purposes fully set forth herein.

BACKGROUND

Field

Embodiments relate to a display apparatus and, more specifically, to a display apparatus using a quantum dot layer.

Discussion of the Background

In display apparatuses such as an organic light-emitting display apparatus, holes and electrons respectively injected from an anode and a cathode recombine in an emission layer to generate light which is emitted, thereby producing an image. For example, pixels emitting light of any one color of red, green, and blue are included, and a certain color is realized by a color combination of pixels that emit light.

To this end, each pixel includes: a light-emitting device that generates monochromatic light such as white light or blue light; and a quantum dot layer and a color filter which are light control members for converting the monochromatic light into a color from among red, green, and blue. That is, when the light-emitting device of each pixel generates monochromatic light, the monochromatic light is converted into one of red, green, and blue colors while passing through the quantum dot layer and the color filter, and then the converted light is emitted.

The above information disclosed in this Background section is only for understanding of the background of the inventive concepts, and, therefore, it may contain information that does not constitute prior art.

SUMMARY

One or more embodiments include an ink composition used for manufacturing a layer having a refractive index of about 1.1 to about 1.5 and a display apparatus including a layer prepared therefrom.

Additional features of the inventive concepts implemented in the embodiments described herein will be set forth in the description that follows, and in part will be apparent from the description, or may be learned by practice of the inventive concepts.

According to one or more embodiments, an ink composition includes: a scatterer, a monomer, and a dispersant, wherein a layer formed using the ink composition has a refractive index of 1.1 to 1.5.

The dispersant may include a polyacrylate-based compound containing a Si moiety, a polyurethane-based compound containing a Si moiety, a polyethylene-based compound containing a Si moiety, or any combination thereof.

The polyacrylate-based compound containing a Si moiety, the polyurethane-based compound containing a Si moiety, or the polyethylene-based compound containing a Si moiety may include a carboxyl group and/or an amine group.

The monomer may be an acrylate-based monomer that includes a Si moiety.

The vapor pressure of the ink composition may be from about $10^{-6}$ mmHg to about $10^{-3}$ mmHg.

The surface energy of the ink composition may be from about 1 dyne/cm to about 20 dyne/cm.

The viscosity of the ink composition may be from about 1 cps to about 40 cps.

The ink composition may not include a solvent.

The scatterer may include a metal oxide, a non-metal oxide, or any combination thereof.

The scatterer may be an oxide of titanium, silver, aluminum, or any combination thereof.

The ink composition may further include particles having a refractive index of about 1.1 to about 1.5.

The particles may include $SiO_2$ particles, $MgF_2$ particles, or any combination thereof.

The ink composition may further include: particles having the refractive index of about 1.1 to about 1.5; and a compound having a carboxyl group and/or an amine group, wherein the scatterer and/or the particle may be surface-treated with the compound having a carboxyl group and/or an amine group.

According to another embodiment, a display apparatus includes: a first substrate on which a plurality of light-emitting devices are located; a plurality of light control members corresponding to the plurality of light-emitting devices disposed on the first substrate; and a plurality of banks arranged between the plurality of light control members, wherein at least one of the light control members includes a layer formed using an ink composition that includes a scatterer, a monomer, and a dispersant.

The layer may have the refractive index of about 1.1 to about 1.5.

Each of the light control members may include a color filter layer, a quantum dot layer, a scattering layer, or any combination thereof.

The display apparatus may include a low refractive index layer having the refractive index about 1.1 to about 1.5, and the low refractive index layer and the layer formed using the ink composition may be positioned adjacent to each other.

The display apparatus may further include an inorganic capping layer.

The display apparatus may further include a low refractive index layer having a refractive index of about 1.1 to about 1.5 and an inorganic capping layer, the inorganic capping layer may be in direct contact with the low refractive index layer, and the inorganic capping layer may be in direct contact with the layer including the ink composition.

The ink composition may further include a compound having a carboxyl group and/or an amine group, and the scatterer may be surface-treated with the compound having a carboxyl group and/or an amine group, and adsorbed onto the surface of the banks.

The ink composition may further include: a compound having a carboxyl group and/or an amine group; and particles of the refractive index of about 1.1 to about 1.5, and the scatterer and/or the particles may be surface-treated with the compound having a carboxyl group and/or an amine group, and adsorbed onto the surface of the banks.

Other aspects, features and advantages other than those described above will become apparent from the following drawings, claims, and detailed description of the invention.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
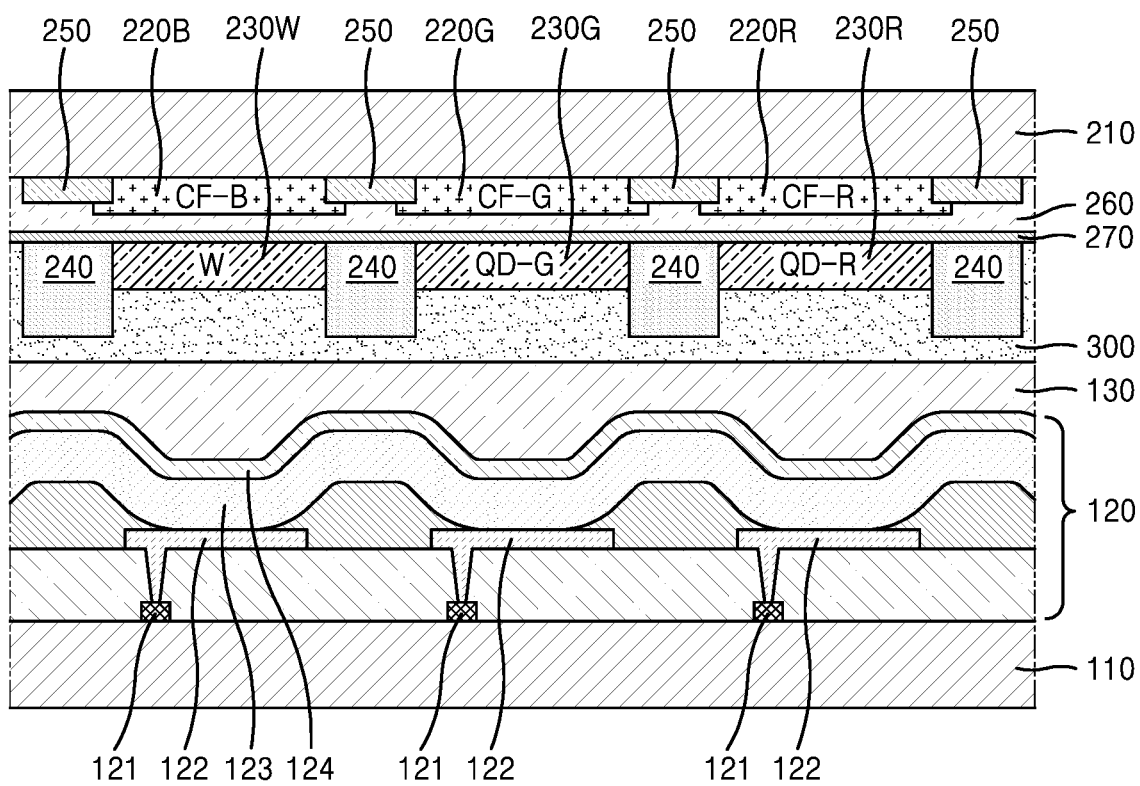
FIG. 1 is a cross-sectional view of a display apparatus according to an embodiment that is constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a cross-sectional view of a display apparatus according to an embodiment that is constructed according to principles of the invention. Here, although only one set of three-color pixels of red, green, and blue is shown, a plurality of sets of such three-color pixels may be distributed in an actual product.

As illustrated in FIG. 1, in the display apparatus according to an embodiment, a first substrate 110, on which a light-emitting device 120 is located, is combined with a second substrate 210, on which quantum dot layers 230R and 230G, a scattering layer 230W, and color filter layers 220R, 220G, and 220B, which are the light control members, are located, with a filler 300 located between the first substrate 110 and the second substrate 210.

In an embodiment, the quantum dot layers 230R and 2230G, the scattering layer 230W, and the color filter layers 220R, 220G, and 220B, which are light control members, may be stacked directly on the light-emitting device 120. In an embodiment, after the light control members are directly stacked on the light-emitting device 120 located on the first substrate 110, the first substrate 110 and the second substrate 210 may be bonded to each other to manufacture a display apparatus. In this case, banks may exist between the light control members.

According to an embodiment, the quantum dot layers 230R and 2230G, the scattering layer 230W, and the color filter layers 220R, 220G, and 220B, which are light control members, may be stacked directly on the light-emitting device 120 located on the first substrate to manufacture a display apparatus, without a second substrate.

First, the light-emitting device 120 has a structure in which an interlayer 123 including an emission layer is located between a first electrode 122 and a second electrode 124, and generates light based on the principle in which holes and electrons injected from the first electrode 122 and the second electrode 124 recombine in the emission layer in the interlayer 123 to emit light. Regarding the generated light, for example, red, green and blue pixels may all produce the same blue light. That is, in the light-emitting device 120, the same blue light is generated and the light control member of each pixel is responsible for converting the same into red, green, and blue. The light-emitting device 120 will be described in detail later.

A reference numeral 121 indicates a pixel circuit connected to the first electrode 122, and includes elements such as a thin-film transistor and a capacitor. Also, a reference numeral 130 indicates a thin-film encapsulation layer that protects the light-emitting device 120 by covering the same, and may be a single-layered film of an organic film or an inorganic film, or may be a multi-layered film in which an organic film and an inorganic film are alternately stacked. The inorganic film may include silicon oxide, silicon nitride, and/or silicon oxynitride, and the organic film may include polyethylene terephthalate, polyethylene naphthalate, polycarbonate, polyimide, polyethylene sulfonate, polyoxymethylene, polyarylate, hexamethyldisiloxane, acryl-based resin (for example, polymethylmethacrylate or polyacrylic acid), or any combination thereof.

The light control members may include a quantum dot layer, a color filter layer, a scattering layer, or any combination thereof.

The quantum dot layers 230R and 2230G, the scattering layer 230W, and the color filter layers 220R, 220G, and 220B may be provided as the light control members, and the quantum dot layers 230R and 230G may convert the blue light generated by the light-emitting device 120 into a target color, such as red or green, and the color filter layers 220R, 220G, and 220B may filter other colors of light that may be mixed with the converted color, to increase the color purity. In this regard, the red and green pixels have quantum dot layers 230R and 230G and the color filter layers 220R and 220G, whereas the blue pixel has the scattering layer 230W and the blue color filter layer 220B. This is because the light generated by the light-emitting device 120 is, for example, blue light. That is, since the blue pixel does not need to change color of light and only needs to allow the light to pass through the scattering layer 230W, only the blue color filter layer 220B for filtering the other color of light is provided.

Reference numeral 260 denotes a low refractive index layer having the refractive index of about 1.2. The quantum dot layers 230R and 230G and the scattering layer 230W of the pixels of the related art are layers having the refractive index of about 1.6. The side-scattered light that has passed through the quantum dot layers 230R and 230G and the scattering layer 230W, is totally reflected at the interface of the low refractive index layer 260 due to the difference between the refractive index of the quantum dot layers 230R and 230G and the scattering layer 230W and the refractive index of the low refractive index layer 260, so that the light is re-scattered inside the quantum dot layers 230R and 230G and the scattering layer 230W. The low refractive index layer 260 is to increase luminance by changing side scattering to front scattering.

However, there is a difference between the degree of side scattering of the quantum dot layers 230R and 230G emitting omnidirectional light and the degree of side scattering of the scattering layer 230W scattering a lower light source, inside the pixel. As a result, the decrease in luminance from the front to the side is greater in the case of blue light than in the case of green light (limitation of viewing angle).

To address this limitation, by matching the refractive index of the scattering layer 230W with the refractive index of the low refractive index layer 260, the critical angle increase with the scattering layer 230W and the low refractive index layer 260 is implemented, and the side viewing angle of the blue light from the blue pixel is increased.

The Ink composition according to an embodiment includes: a moiety (for example, a Si moiety) that may lower the refractive index in a monomer or dispersant included in the ink composition; or particles having a low refractive index in the ink composition. By doing so, the refractive index of the scattering layer 230W manufactured therefrom may be lowered to implement a critical angle increase with the scattering layer 230W and the low refractive index layer 260, and the side viewing angle of blue light from the blue pixel may be improved.

In an embodiment, the dispersant may include a polyacrylate-based compound containing a Si moiety, a polyurethane-based compound containing a Si moiety, a polyethylene-based compound containing a Si moiety, or any combination thereof.

The dispersant may coat the surface of the scatterer or may exist alone in the ink composition.

The Si moiety included in the polyacrylate-based compound, the polyurethane-based compound, and the polyethylene-based compound may lower the refractive index of the layer formed by curing the ink composition.

In an embodiment, the polyacrylate-based compound containing a Si moiety, the polyurethane-based compound containing a Si moiety, or the polyethylene-based compound containing a Si moiety may include a carboxyl group and/or an amine group.

By including a carboxyl group and/or an amine group, the dispersant may be coated on the surface of the scatterer. The expressions 'surface treated' and 'adsorbed onto the surface' used herein have the same meaning as the expression 'coated.'

The amount of the dispersant may be about 0.01 wt % to about 2 wt % based on 100 wt % of the monomer. The amount range of the dispersant is appropriate when taking into consideration of the amount of other components in the ink composition and the role as the dispersant.

In an embodiment, the monomer may be an acrylate-based monomer including a Si moiety.

Since the acrylate-based monomer includes a Si moiety, the refractive index of the layer formed by curing the ink composition may be lowered.

For example, the acrylate-based monomer including a Si moiety may be a compound of Formula 1 below.

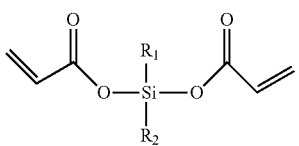

Formula 1 wherein, in Formula 1, $R_1$ and $R_2$ may each independently be hydrogen, deuterium, a $C_1$-$C_{60}$ alkyl group unsubstituted or substituted with at least one $R_{10a}$, a $C_2$-$C_{60}$ alkenyl group unsubstituted or substituted with at least one $R_{10a}$, a $C_2$-$C_{60}$ alkynyl group unsubstituted or substituted with at least one $R_{10a}$, a $C_1$-$C_{60}$ alkoxy group unsubstituted or substituted with at least one $R_{10a}$, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$.

When the monomer is an acrylate-based monomer containing a Si moiety, the dispersant may include a commonly used polyamine-based dispersant.

In an embodiment, the vapor pressure of the ink composition may be from about $10^{-6}$ mmHg to about $10^{-3}$ mmHg.

In an embodiment, the surface energy of the ink composition may be from about 1 dyne/cm to about 20 dyne/cm.

In an embodiment, the viscosity of the ink composition may be from about 1 cps to about 40 cps.

When the vapor pressure, surface energy, and viscosity of the ink composition are within these ranges, the ink composition may be suitable for a solution process, for example, an inkjet process.

The ink composition may include a solvent, for example, an organic solvent. In an embodiment, the ink composition may not include a solvent.

In an embodiment, the scatterer may include a metal oxide, a non-metal oxide, or any combination thereof.

In an embodiment, the scatterer may be an oxide of titanium, silver, aluminum, or any combination thereof.

For example, the size of the scatterer may be from about 50 nm to about 300 nm. When the size of the scatterer is within the above range, the scatterer may be optimal for scattering blue light.

The amount of the scatterer may be from about 1 wt % to about 10 wt % based on 100 wt % of the monomer. This range may be appropriate when taking into consideration of the role of the scattering layer 230W and the amounts of other components in the ink composition.

In an embodiment, the ink composition may further include particles having a refractive index of about 1.1 to about 1.5. For example, particles may include $SiO_2$ particles, $MgF_2$ particles, or any combination thereof.

For example, the size of the particles may be from about 1 nm to about 300 nm. The amount of the particles may be about 0.1 wt % to about 20 wt % based on 100 wt % of the monomer.

In an embodiment, the ink composition may further include: particles having the refractive index of about 1.1 to about 1.5; and a compound having a carboxyl group and/or an amine group.

The scatterer and/or the particles may be surface-treated with the compound having a carboxyl group and/or an amine group.

The compound having a carboxyl group may be a compound having an acid value of 5 mg KOH/g or more. The acid value refers to the quantity of mg of KOH required to neutralize the COOH contained in 1 g of the compound having a carboxyl group.

The compound having an amine group may be a compound having an amine value of 5 mg KOH/g or more. The amine number refers to the quantity of mg of the tilted KOH consumed per 1 g of the compound having an amine group.

When the acid value and the amine value of the compound having a carboxyl group and/or an amine group are within these ranges, the compound may coat, in the form of a ligand, the surface of the scatterer and/or the particles.

The scatterer and/or particles surface-treated, for example, surface-coated, with the compound having a carboxyl group and/or an amine group may migrate to the surface of banks in an inkjet process and is, for example, adsorbed onto the bank. That is, the surface of banks may be coated with the scatterer and/or the particles by the compound having a carboxyl group and/or an amine group.

The banks coated with the scatterer and/or the particles may reduce light absorbed into the bank through reflection, total reflection, refraction, etc. and may increase light extracted out of the bank. Thus, the luminance may be increased and the scattering angle may be reduced.

The amount of the compound having a carboxyl group and/or an amine group may be from about 0.1 wt % to about 10 wt % based on 100 wt % of the monomer. This amount of the compound having a carboxyl group and/or an amine group is appropriate when taking into consideration of the amount of the scatterer and the amount of particles having the refractive index of about 1.1 to about 1.5.

A display apparatus according to an embodiment includes: a first substrate on which a plurality of light-emitting devices are located; a plurality of light control members corresponding to the plurality of light-emitting devices on the first substrate; and a plurality of banks arranged between the plurality of light control members, wherein at least one of the light control members includes a layer formed using an ink composition including a scatterer, a monomer, and a dispersant, and the layer may have the refractive index of about 1.1 to about 1.5.

In an embodiment, each of the light control members may include a color filter layer, a quantum dot layer, a scattering layer, or any combination thereof.

The layer formed using the ink composition may be located in at least any one area of above or below the red pixel, the green pixel, or the blue pixel. For example, the layer formed using the ink composition may be the scattering layer 230W in FIG. 1.

A reference numeral 250 may indicate a black matrix located between each pixel for blocking light, and a reference numeral 240 may indicate a bank defining a boundary between the light control members of pixels.

In an embodiment, the banks 240 and the black matrix 250 may be formed integrally. In this case, an integrated form of the bank and the black matrix may include a black pigment and a scattering agent.

One surface of the banks 240 facing the first substrate 110 may have a hydrophobic property.

Light (for example, monochromatic light) generated from a light source (for example, an organic light-emitting device) is converted into light of red, green, or blue while passing through the quantum dot layers and the color filter layers, and then the converted light is emitted.

In forming the banks 240, a bank composition is applied on a substrate and cured, and then undergoes a photolithography process.

The bank composition includes a curable polymer, a photoresist compound, a fluorine-containing polymer, a black pigment, a scattering agent, and a solvent, wherein, when the bank composition is cured, the solvent evaporates completely.

Next, between the first substrate 110 and the second substrate 210, the filler 300 may act both a binding agent and a gap maintainer, and maintains an appropriate level of the gap between the first substrate 110 and the second substrate 210 constant. Accordingly, when the filler 300 is coated between the first substrate 110 and the second substrate 210, which are then bonded together, the filler 300 firmly bonds the first substrate 110 and the second substrate 210 while properly maintaining a gap therebetween.

The display apparatus having the above structure may be manufactured through the process shown in FIGS. 2A to 2F.

Figure 2A:
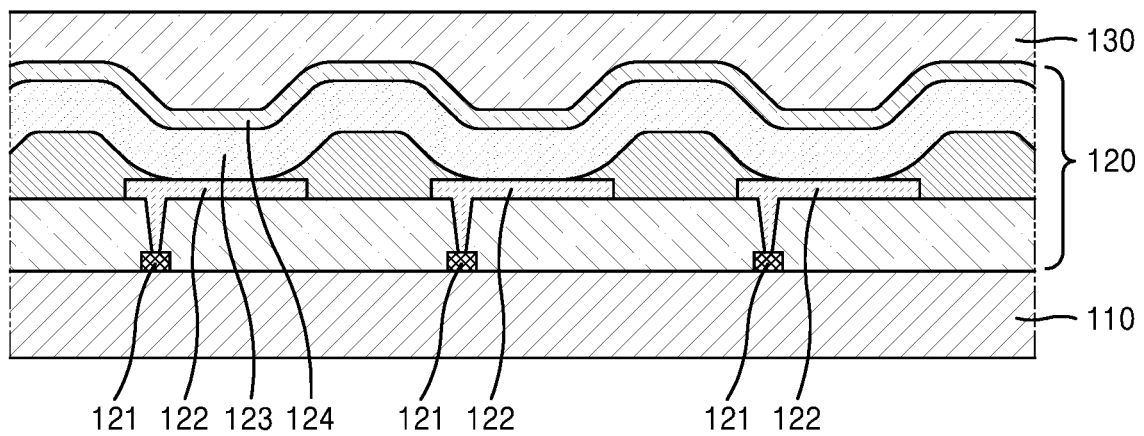
FIGS. 2A to 2F are cross-sectional views sequentially illustrating a process of manufacturing the display apparatus of FIG. 1.

First, as shown in FIG. 2A, the light-emitting device 120 is formed on the first substrate 110, and is covered by the thin-film encapsulation layer 130.

Figure 2B:
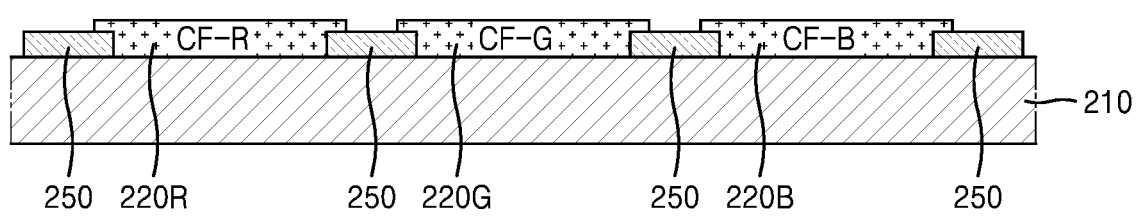

Then, as shown in FIG. 2B, the black matrix 250 and the color filter layers 220R, 220G, and 220B are each formed on the second substrate 210 through a photolithography process. The color filter layers 220R, 220G, and 220B may each be formed in a region corresponding to a corresponding light-emitting device.

Figure 2C:
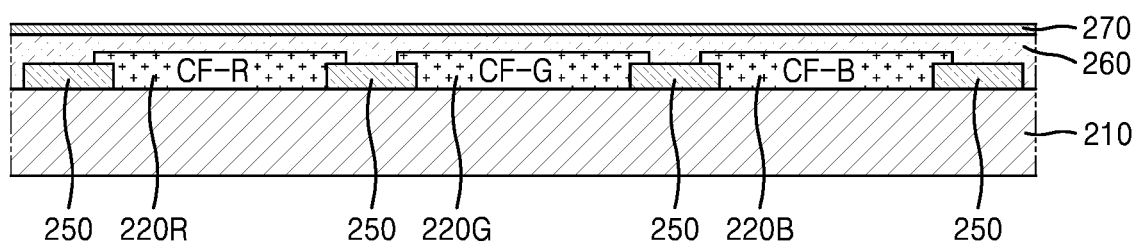

Then, as shown in FIG. 2C, for example, a hollow silica material is prepared on the color filter layers 220R, 220G, and 220B and the black matrix 250 to form the low refractive index layer 260 on the color filter layers 220R, 220G, and 220B and the black matrix 250. The low refractive index layer 260 may have the refractive index of about 1.1 to about 1.5, and the thickness of about 0.1 m to about 5 m.

Optionally, an inorganic capping layer 270 may be formed on the low refractive index layer 260 by vapor chemical deposition.

The inorganic capping layer 270 is a layer including an oxide of Si, N, or any combination thereof, and may have the thickness of about 1000 Å to about 10000 Å. The inorganic capping layer 270 may have the same refractive index as that of the layer formed using the ink composition, or the difference between the refractive index thereof and the refractive index of the layer may be 0.5 or less. In some embodiments, the inorganic capping layer 270 may be omitted. In this case, the scattering layer 230W and the low refractive index layer 260 may be in direct contact with each other.

Figure 2D:
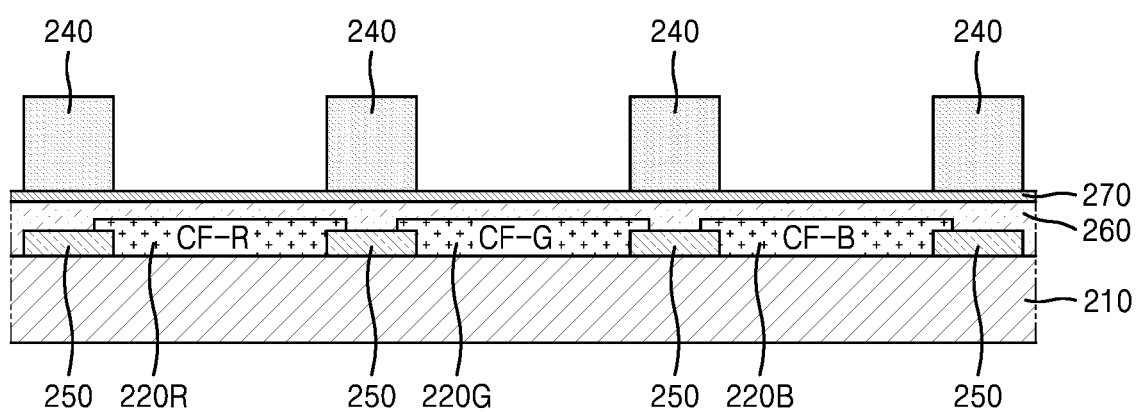

Next, as illustrated in FIG. 2D, the banks 240 may be patterned so as to remain respectively corresponding to in between the color filter layers 220R, 220G, and 220B of the pixels.

Figure 2E:
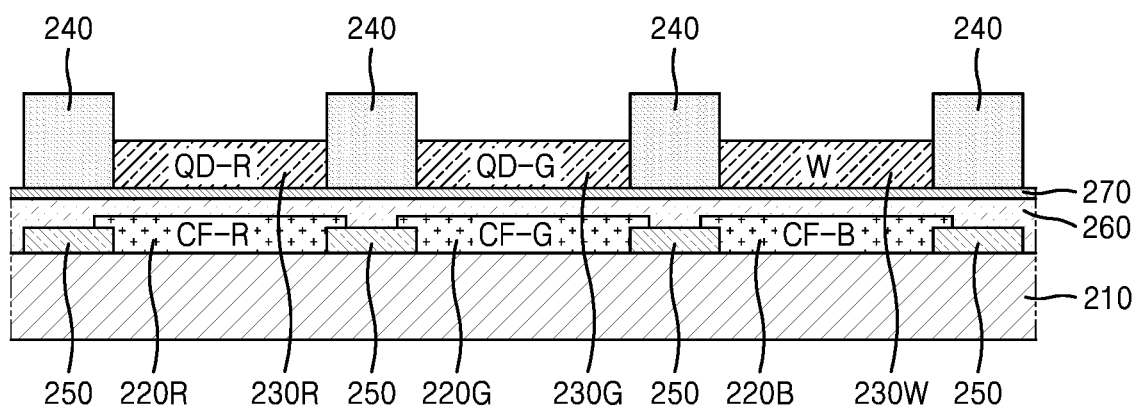

Thereafter, as illustrated in FIG. 2E, the quantum dot layers 230R and 230G may be formed in the red pixel and the green pixel, and the scattering layer 230W may be formed in the blue pixel. In this regard, the quantum dot layers 230R and 230G may overlap with the color filter layers 220R and 220G, respectively. The scattering layer 230W and the color filter layer 220B may overlap each other. The quantum dot layers 230R and 230G and the scattering layer 230W may be formed by an inkjet process.

Quantum dots or cores that are photochromic particles included in the quantum dot layers 230R and 230C may include a Group II-VI semiconductor compound, a Group III-V semiconductor compound, a Group III-VI semiconductor compound, a Group I-III-VI semiconductor compound, a Group IV-VI semiconductor compound, a Group IV element or compound, or any combination thereof.

Examples of the Group II-VI semiconductor compound are a binary compound, such as CdSe, CdTe, ZnS, ZnSe, ZnTe, ZnO, HgS, HgSe, HgTe, MgSe, or MgS; a ternary compound, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, or MgZnS; a quaternary compound, such as CdZnSeS, CdZnSeTe, CdZnSTe, CdHgSeS, CdHgSeTe, CdHgSTe, HgZnSeS, HgZnSeTe, or HgZnSTe; and any combination thereof.

Examples of the Group III-V semiconductor compound may include: a binary compound, such as GaN, GaP, GaAs, GaSb, AlN, AlP, AlAs, AlSb, InN, InP, InAs, or InSb; a ternary compound, such as GaNP, GaNAs, GaNSb, GaPAs, GaPSb, AlNP, AlNAs, AlNSb, AlPAs, AlPSb, InGaP, InNP, InAlP, InNAs, InNSb, InPAs, or InPSb; a quaternary compound, such as GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, or InAlPSb; and any combination thereof. The Group III-V semiconductor compound may further include a Group II element. Examples of the Groups III-V semiconductor compound further including a Group II element are InZnP, InGaZnP, InAlZnP, etc.

Examples of the Group III-VI semiconductor compound are: a binary compound, such as GaS, GaSe, $Ga_2Se_3$, GaTe, InS, InSe, $In_2S_3$, $In_2Se_3$, or InTe; a ternary compound, such as $InGaS_3$, or $InGaSe_3$; and any combination thereof.

Examples of the Group I-III-VI semiconductor compound are: a ternary compound, such as AgInS, $AgInS_2$, CuInS, $CuInS_2$, $CuGaO_2$, $AgGaO_2$, or $AgAlO_2$; and any combination thereof.

Examples of the Group IV-VI semiconductor compound are: a binary compound, such as SnS, SnSe, SnTe, PbS, PbSe, or PbTe; a ternary compound, such as SnSeS, SnSeTe, SnالسTe, PbSeS, PbSeTe, PbSTe, SnPbS, SnPbSe, or SnPbTe; a quaternary compound, such as SnPbSSe, SnPbSeTe, or SnPbSTe; and any combination thereof.

The Group IV element or compound may include: a single element compound, such as Si or Ge; a binary compound, such as SiC or SiGe; and any combination thereof.

Each element included in a multi-element compound such as the binary compound, the ternary compound, and the quaternary compound may be present at a uniform concentration or non-uniform concentration in a particle.

The quantum dot may have a single structure in which the concentration of each element in the quantum dot is uniform, or a core-shell dual structure. For example, the material included in the core and the material included in the shell may be different from each other.

The shell of the quantum dot may act as a protective layer that prevents chemical degeneration of the core to maintain semiconductor characteristics, and/or as a charging layer that imparts electrophoretic characteristics to the quantum dot. The shell may be a single layer or a multi-layer. The interface between the core and the shell may have a concentration gradient in which the concentration of an element existing in the shell decreases toward the center of the core.

Examples of the shell of the quantum dot may be an oxide of metal, metalloid, or non-metal, a semiconductor compound, and any combination thereof. Examples of the oxide of metal, metalloid, or non-metal are a binary compound, such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, or NiO; a ternary compound, such as $MgAl_2O_4$, $CoFe_2O_4$, $NiFe_2O_4$, or $CoMn_2O_4$; and any combination thereof. Examples of the semiconductor compound are, as described herein, Group II-VI semiconductor compounds; Group III-V semiconductor compounds; Group III-VI semiconductor compounds; Group 1-III-VI semiconductor compounds; Group IV-VI semiconductor compounds; and any combination thereof. For example, the semiconductor compound may include CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, or any combination thereof.

A full width at half maximum (FWHM) of the emission wavelength spectrum of the quantum dot may be about 45 nm or less, for example, about 40 nm or less, for example, about 30 nm or less, and within these ranges, color purity or color reproducibility may be increased. In addition, since the light emitted through the quantum dot is emitted in all directions, the wide viewing angle may be improved.

In addition, the quantum dot may be in the form of a spherical particle, a pyramidal particle, a multi-arm particle, a cubic nanoparticle, a nanotube particle, a nanowire particle, a nanofiber particle, or a nanoplate particle.

Since the energy band gap may be adjusted by controlling the size of the quantum dot, light having various wavelength bands may be obtained from the quantum dot emission layer. Accordingly, by using quantum dots of different sizes, a light-emitting device that emits light of various wavelengths may be implemented. In one or more embodiments, the size of the quantum dot may be selected to emit red, green and/or blue light. In addition, the size of the quantum dot may be configured to emit white light by combination of light of various colors.

Figure 2F:
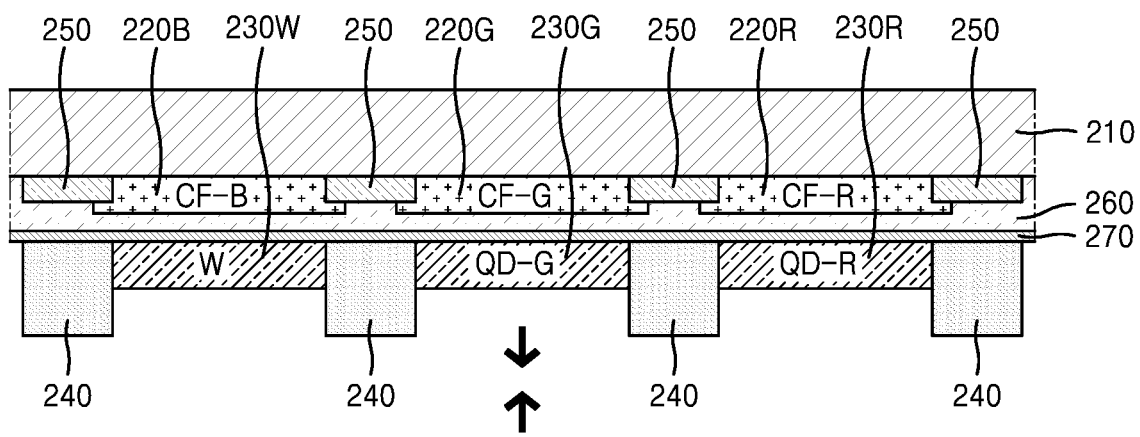
Figure 2F:
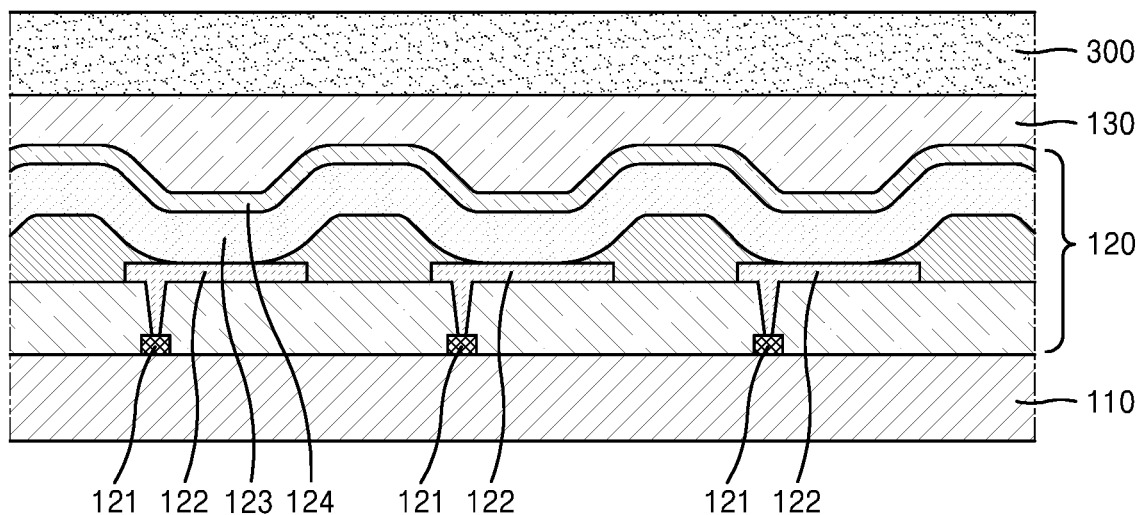

After the quantum dot layers 230R and 230G are formed, the filler 300 is applied between the first substrate 110 and the second substrate 210, which are then combined as illustrated in FIG. 2F. As a result, as illustrated in FIG. 1, a display apparatus provided with the light-emitting device 120, the quantum dot layers 230R and 230G, and the color filter layers 220R, 220G, and 220B may be implemented.

Figure 3:
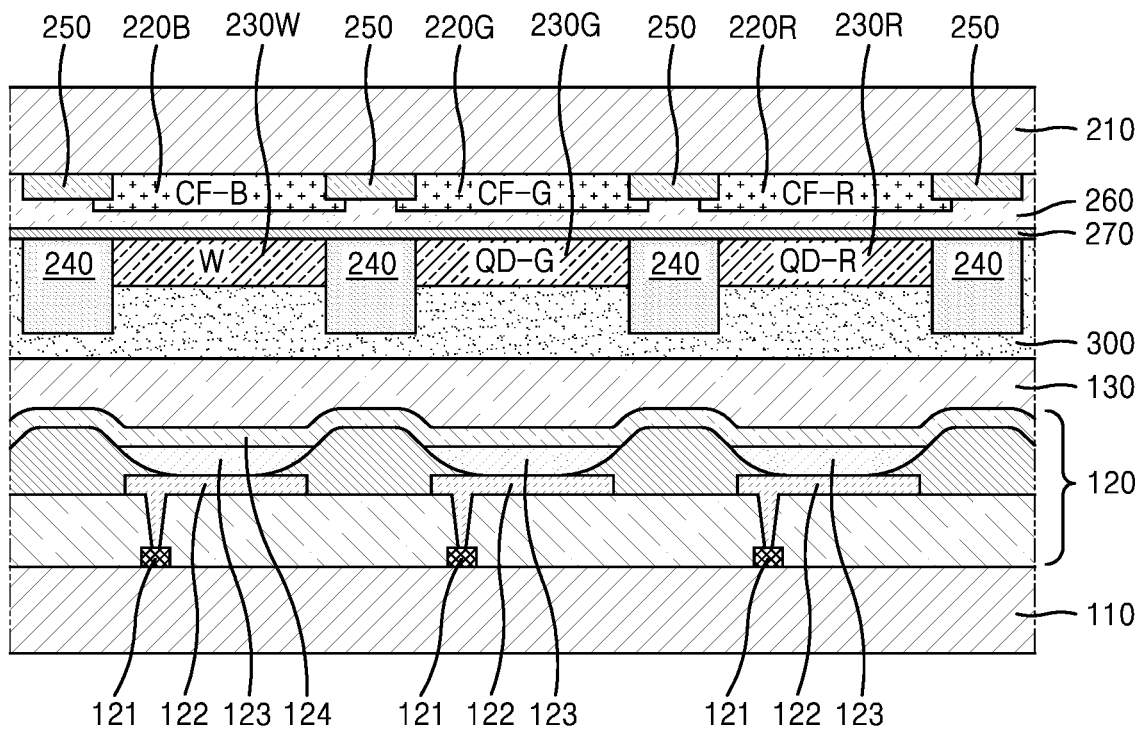
FIG. 3 is a cross-sectional view of a display apparatus according to an embodiment.

The embodiment described herein illustrates a case in which the interlayer 123 including the emission layer is formed as a common layer across the entire pixel area. However, as shown in FIG. 3, a modification example in which an interlayer is separately formed for each pixel is also possible. That is, the interlayer 123 including the emission layer may be formed as a common layer, or may be formed separately for each pixel.

The emission layer may include an organic light-emitting material or a light-emitting material.

The light-emitting device 120 will be described in detail.

[First Electrode 122]

In FIG. 1, a substrate may be additionally located under the first electrode 122 or above the second electrode 124. As the substrate, a glass substrate or a plastic substrate may be used.

The first electrode 122 may be formed by, for example, depositing or sputtering a material for forming the first electrode 122 on the substrate. When the first electrode 122 is an anode, a material for forming the first electrode 122 may be a high work function material that facilitates injection of holes.

The first electrode 122 may be a reflective electrode, a semi-transmissive electrode, or a transmissive electrode. When the first electrode 122 is a transmissive electrode, a material for forming the first electrode 122 may include indium tin oxide (ITO), indium zinc oxide (IZO), tin oxide ($SnO_2$), zinc oxide (ZnO), or any combinations thereof. In one or more embodiments, when the first electrode 122 is a semi-transmissive electrode or a reflective electrode, magnesium (Mg), silver (Ag), aluminum (Al), aluminum-lithium (Al—Li), calcium (Ca), magnesium-indium (Mg—In), magnesium-silver (Mg—Ag), or any combinations thereof may be used as a material for forming a first electrode.

The first electrode 122 may have a single-layered structure consisting of a single layer or a multi-layered structure including a plurality of layers. In an embodiment, the first electrode 122 may have a three-layered structure of ITO/Ag/ITO.

[Interlayer 123]

The interlayer 123 may be located on the first electrode 122. The interlayer 123 may include an emission layer.

The interlayer 123 may further include a hole transport region located between the first electrode 122 and the emission layer and an electron transport region located between the emission layer and the second electrode 124.

The interlayer 123 may further include, in addition to various organic materials, metal-containing compounds such as organometallic compounds, inorganic materials such as quantum dots, and the like.

In one or more embodiments, the interlayer 123 may include, i) two or more emitting units sequentially stacked between the first electrode 122 and the second electrode 124, and ii) a charge generation layer located between the two emitting units. When the interlayer 123 includes the emitting unit and the charge generation layer as described above, the light-emitting device 120 may be a tandem light-emitting device.

[Hole Transport Region in Interlayer 123]

The hole transport region may have: i) a single-layered structure consisting of a single layer consisting of a single material, ii) a single-layered structure consisting of a single layer consisting of a plurality of different materials, or iii) a multi-layered structure including a plurality of layers including different materials.

The hole transport region may include a hole injection layer, a hole transport layer, an emission auxiliary layer, an electron-blocking layer, or any combination thereof.

In an embodiment, the hole transport region may have a multi-layered structure including a hole injection layer/hole transport layer structure, a hole injection layer/hole transport layer/emission auxiliary layer structure, a hole injection layer/emission auxiliary layer structure, a hole transport layer/emission auxiliary layer structure, or a hole injection layer/hole transport layer/electron blocking layer structure, wherein, in each structure, layers are stacked sequentially from the first electrode 122.

The hole transport region may include a compound represented by Formula 201, a compound represented by Formula 202, or any combination thereof:

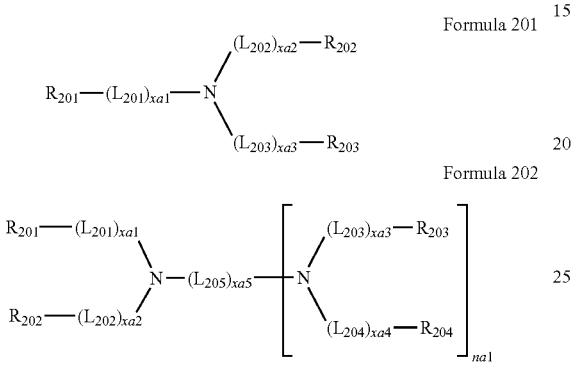

Formula 201

Formula 202 wherein, in Formulae 201 and 202, $L_{201}$ to $L_{204}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, $L_{205}$ may be *—O—*', *—S—*', *—N($Q_{201}$)-*', a $C_1$-$C_{20}$ alkylene group unsubstituted or substituted with at least one $R_{10a}$, a $C_2$-$C_{20}$ alkenylene group unsubstituted or substituted with at least one $R_{10a}$, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$, xa1 to xa4 may each independently be an integer from 0 to 5, xa5 may be an integer from 1 to 10, $R_{201}$ to $R_{204}$ and $Q_{201}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, $R_{201}$ and $R_{202}$ may optionally be linked to each other via a single bond, a $C_1$-$C_5$ alkylene group unsubstituted or substituted with at least one $R_{10a}$, or a $C_2$-$C_5$ alkenylene group unsubstituted or substituted with at least one $R_{10a}$, to form a $C_8$-$C_{60}$ polycyclic group (for example, a carbazole group or the like) unsubstituted or substituted with at least one $R_{10a}$, $R_{203}$ and $R_{204}$ may optionally be linked to each other, via a single bond, a $C_1$-$C_5$ alkylene group unsubstituted or substituted with at least one $R_{10a}$, or a $C_2$-$C_5$ alkenylene group unsubstituted or substituted with at least one $R_{10a}$, to form a $C_8$-$C_{60}$ polycyclic group unsubstituted or substituted with at least one $R_{10a}$, and na1 may be an integer from 1 to 4.

For example, each of Formulae 201 and 202 may include at least one of groups represented by Formulae CY201 to CY217.

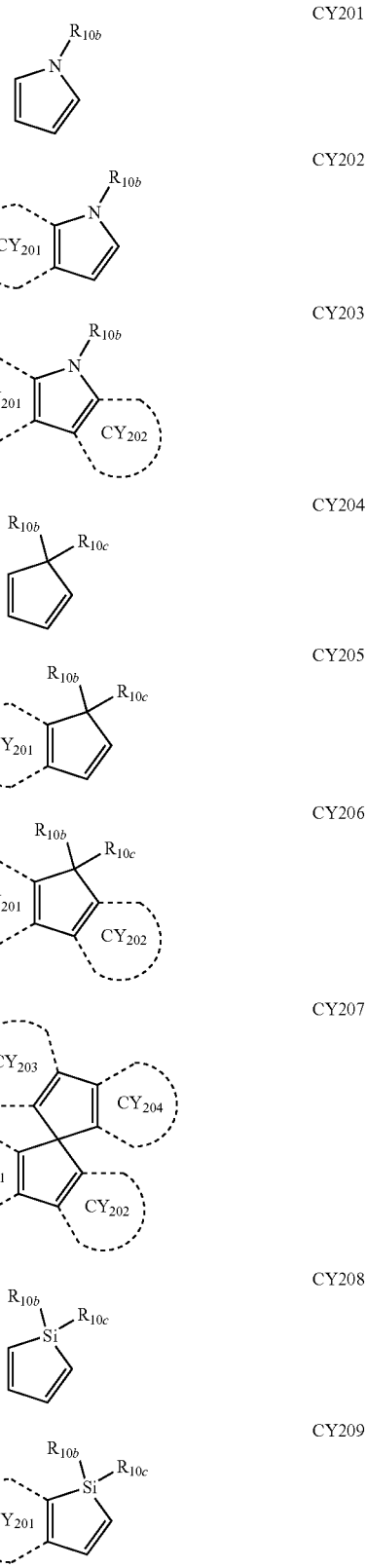

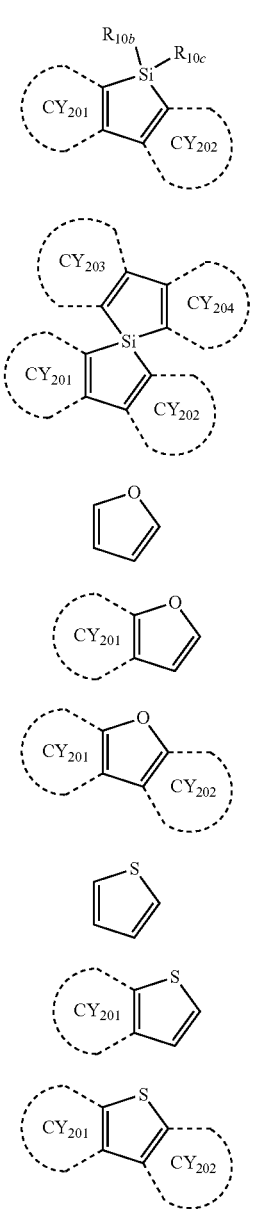

$R_{10b}$ and $R_{10c}$ in Formulae CY201 to CY217 are the same as described in connection with $R_{10a}$, ring $CY_{201}$ to ring $CY_{204}$ may each independently be a $C_3$-$C_{20}$ carbocyclic group or a $C_1$-$C_{20}$ heterocyclic group, and at least one hydrogen in Formulae CY201 to CY217 may be unsubstituted or substituted with $R_{10a}$.

A thickness of the hole transport region may be in a range of about 50 Å to about 10,000 Å, for example, about 100 Å to about 4,000 Å. When the hole transport region includes a hole injection layer, a hole transport layer, or any combination thereof, a thickness of the hole injection layer may be in a range of about 100 Å to about 9,000 Å, for example, about 100 Å to about 1,000 Å, and a thickness of the hole transport layer may be in a range of about 50 Å to about 2,000 Å, for example, about 100 Å to about 1,500 Å. When the thicknesses of the hole transport region, the hole injection layer, and the hole transport layer are within these ranges, satisfactory hole transporting characteristics may be obtained without a substantial increase in driving voltage.

The emission auxiliary layer may increase light-emission efficiency by compensating for an optical resonance distance according to the wavelength of light emitted from the emission layer, and the electron-blocking layer may block the leakage of electrons from the emission layer to the hole transport region. Materials that may be included in the hole transport region may be included in the emission auxiliary layer and the electron-blocking layer.

[p-Dopant]

The hole transport region may further include, in addition to these materials, a charge-generation material for the improvement of conductive properties. The charge-generation material may be uniformly or non-uniformly dispersed in the hole transport region (for example, in the form of a single layer consisting of a charge-generation material).

The charge-generation material may be, for example, a p-dopant.

For example, the lowest unoccupied molecular orbital (LUMO) energy level of the p-dopant may be −3.5 eV or less.

In one or more embodiments, the p-dopant may include a quinone derivative, a cyano group-containing compound, a compound including element EL1 and element EL2, or any combination thereof.

Examples of the quinone derivative are TCNQ, F4-TCNQ, etc.

Examples of the cyano group-containing compound are HAT-CN, and a compound represented by Formula 221 below.

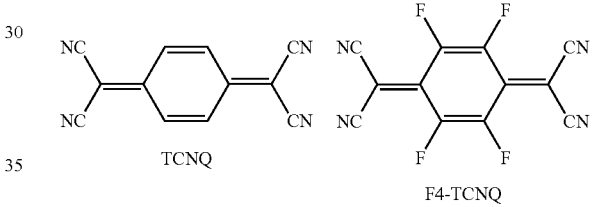

TCNQ F4-TCNQ

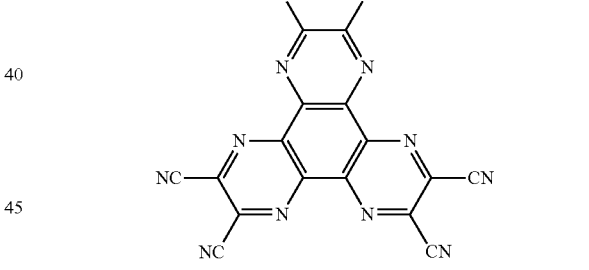

HAT-CN

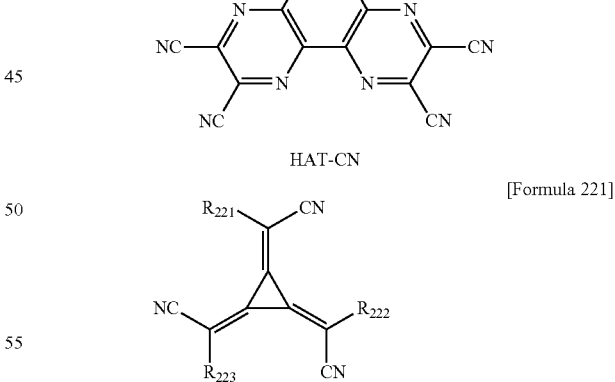

[Formula 221]

In Formula 221,
$R_{221}$ to $R_{223}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, and
at least one of $R_{221}$ to $R_{223}$ may each independently be a $C_3$-$C_{60}$ carbocyclic group or a $C_1$-$C_{60}$ heterocyclic group, each substituted with a cyano group; —F; —Cl; —Br; —I; a $C_1$-$C_{20}$ alkyl group substituted with a cyano group, —F, —Cl, —Br, —I, or any combination thereof, or any combination thereof.

In the compound including element EL1 and element EL2, element EL1 may be metal, metalloid, or any combination thereof, and element EL2 may be non-metal, metalloid, or any combination thereof.

[Emission Layer in Interlayer 123]

When the light-emitting device 120 is a full-color light-emitting device, the emission layer may be patterned into a red emission layer, a green emission layer, and/or a blue emission layer, according to a sub-pixel. In one or more embodiments, the emission layer may have a stacked structure of two or more layers of a red emission layer, a green emission layer, and a blue emission layer, in which the two or more layers contact each other or are separated from each other to emit white light. In one or more embodiments, the emission layer may include two or more materials of a red light-emitting material, a green light-emitting material, and a blue light-emitting material, in which the two or more materials are mixed with each other in a single layer to emit white light.

The emission layer may include a host and a dopant. The dopant may include a phosphorescent dopant, a fluorescent dopant, or any combination thereof.

The amount of the dopant in the emission layer may be from about 0.01 to about parts by weight based on 100 parts by weight of the host.

In one or more embodiments, the emission layer may include a quantum dot. The quantum dot is the same as described above.

The emission layer may include a delayed fluorescence material. The delayed fluorescence material may act as a host or a dopant in the emission layer.

A thickness of the emission layer may be in a range of about 100 Å to about 1,000 Å, for example, about 200 Å to about 600 Å. When the thickness of the emission layer is within these ranges, excellent light-emission characteristics may be obtained without a substantial increase in driving voltage.

[Host]

In one or more embodiments, the host may include a compound represented by Formula 301 below:

$$[Ar_{301}]_{xb11}\text{-}[(L_{301})_{xb1}\text{-}R_{301}]_{xb21} \quad \text{Formula 301}$$

wherein, in Formula 301, $Ar_{301}$ and $L_{301}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, xb11 may be 1, 2, or 3, xb1 may be an integer from 0 to 5, $R_{301}$ may be hydrogen, deuterium, —F, —Cl, —Br, —I, a hydroxyl group, a cyano group, a nitro group, a $C_1$-$C_{60}$ alkyl group unsubstituted or substituted with at least one $R_{10a}$, a $C_2$-$C_{60}$ alkenyl group unsubstituted or substituted with at least one $R_{10a}$, a $C_2$-$C_{60}$ alkynyl group unsubstituted or substituted with at least one $R_{10a}$, a $C_1$-$C_{60}$ alkoxy group unsubstituted or substituted with at least one $R_{10a}$, a $C_3$-$C_{60}$ carbocyclic group unsubstituted or substituted with at least one $R_{10a}$, a $C_1$-$C_{60}$ heterocyclic group unsubstituted or substituted with at least one $R_{10a}$, —Si($Q_{301}$)($Q_{302}$)($Q_{303}$), —N($Q_{301}$)($Q_{302}$), —B($Q_{301}$)($Q_{302}$), —C(=O)($Q_{301}$), —S(=O)$_2$($Q_{301}$), or —P(=O)($Q_{301}$)($Q_{302}$), xb21 may be an integer from 1 to 5, and $Q_{301}$ to $Q_{303}$ are each the same as described herein with respect to $Q_1$.

For example, when xb11 in Formula 301 is 2 or more, two or more of $Ar_{301}$(s) may be linked to each other via a single bond.

In one or more embodiments, the host may include a compound represented by Formula 301-1, a compound represented by Formula 301-2, or any combination thereof:

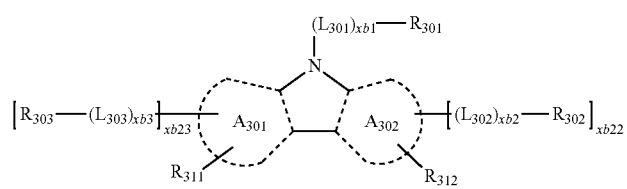

Formula 301-1

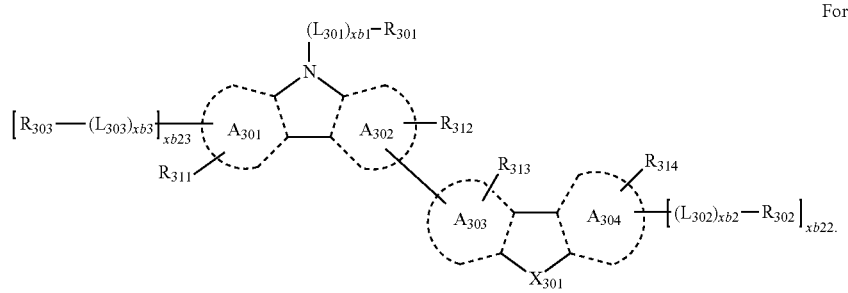

Formula 301-2

In Formulae 301-1 and 301-2,
ring $A_{301}$ to ring $A_{304}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$,
$X_{301}$ may be O, S, N-[$(L_{304})_{xb4}$-$R_{304}$], $C(R_{304})(R_{305})$, or $Si(R_{304})(R_{305})$,
xb22 and xb23 may each independently be 0, 1, or 2,
$L_{301}$, xb1, and $R_{301}$ may each be the same as described herein,
$L_{302}$ to $L_{304}$ may each independently be the same as described herein with respect to with $L_{301}$,
xb2 to xb4 may each independently be the same as described herein with respect to xb1, and
$R_{302}$ to $R_{305}$ and $R_{311}$ to $R_{314}$ may each be the same as described herein with respect to $R_{301}$.

[Phosphorescent Dopant]

In one or more embodiments, the phosphorescent dopant may include at least one transition metal as a central metal.

The phosphorescent dopant may include a monodentate ligand, a bidentate ligand, a tridentate ligand, a tetradentate ligand, a pentadentate ligand, a hexadentate ligand, or any combination thereof.

The phosphorescent dopant may be electrically neutral.

For example, the phosphorescent dopant may include an organometallic compound represented by Formula 401:

$$M(L_{401})_{xc1}(L_{402})_{xc2} \quad \text{Formula 401}$$

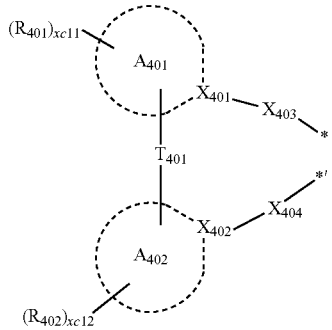

Formula 402 wherein, in Formulae 401 and 402,
M may be transition metal (for example, iridium (Ir), platinum (Pt), palladium (Pd), osmium (Os), titanium (Ti), gold (Au), hafnium (Hf), europium (Eu), terbium (Tb), rhodium (Rh), rhenium (Re), or thulium (Tm)),
$L_{401}$ may be a ligand represented by Formula 402, and xc1 may be 1, 2, or 3, wherein when xc1 is two or more, two or more of $L_{401}$(s) may be identical to or different from each other,
$L_{402}$ may be an organic ligand, and xc2 may be 0, 1, 2, 3, or 4, and when xc2 is 2 or more, two or more of $L_{402}$(s) may be identical to or different from each other,
$X_{401}$ and $X_{402}$ may each independently be nitrogen or carbon,
ring $A_{401}$ and ring $A_{402}$ may each independently be a $C_3$-$C_{60}$ carbocyclic group or a $C_1$-$C_{60}$ heterocyclic group,
$T_{401}$ may be a single bond, —O—, —S—, —C(=O)—, —N($Q_{411}$)-, —C($Q_{411}$)($Q_{412}$)-, —C($Q_{411}$)=C($Q_{412}$)-, —C($Q_{411}$)=, or =C=,
$X_{403}$ and $X_{404}$ may each independently be a chemical bond (for example, a covalent bond or a coordination bond), O, S, N($Q_{413}$), B($Q_{413}$), P($Q_{413}$), C($Q_{413}$)($Q_{414}$), or Si($Q_{413}$)($Q_{414}$),
$Q_{411}$ to $Q_{414}$ may each be the same as described herein with respect to $Q_1$,
$R_{401}$ and $R_{402}$ may each independently be hydrogen, deuterium, —F, —Cl, —Br, —I, a hydroxyl group, a cyano group, a nitro group, a $C_1$-$C_{20}$ alkyl group unsubstituted or substituted with at least one $R_{10a}$, a $C_1$-$C_{20}$ alkoxy group unsubstituted or substituted with at least one $R_{10a}$, a $C_3$-$C_{60}$ carbocyclic group unsubstituted or substituted with at least one $R_{10a}$, a $C_1$-$C_{60}$ heterocyclic group unsubstituted or substituted with at least one $R_{10a}$, —Si($Q_{401}$)($Q_{402}$)($Q_{403}$), —N($Q_{401}$)($Q_{402}$), —B($Q_{401}$)($Q_{402}$), —C(=O)($Q_{401}$), —S(=O)$_2$($Q_{401}$), or —P(=O)($Q_{401}$)($Q_{402}$),
$Q_{401}$ to $Q_{403}$ may each be the same as described herein with respect to $Q_1$, xc11 and xc12 may each independently be an integer from 0 to 10, and
* and *' in Formula 402 each indicate a binding site to M in Formula 401.

For example, in Formula 402, i) $X_{401}$ may be nitrogen, and $X_{402}$ may be carbon, or ii) each of $X_{401}$ and $X_{402}$ may be nitrogen.

In one or more embodiments, when xc1 in Formula 402 is 2 or more, two ring $A_{401}$ in two or more of $L_{401}$(s) may be optionally linked to each other via $T_{402}$, which is a linking group, and two ring $A_{402}$ may be optionally linked to each other via $T_{403}$, which is a linking group. $T_{402}$ and $T_{403}$ may each be the same as described herein with respect to $T_{401}$.

$L_{402}$ in Formula 401 may be an organic ligand. For example, $L_{402}$ may include a halogen group, a diketone group (for example, an acetylacetonate group), a carboxylic acid group (for example, a picolinate group), —C(=O), an isonitrile group, —CN group, a phosphorus group (for example, a phosphine group, a phosphite group, etc.), or any combination thereof.

[Fluorescent Dopant]

The fluorescent dopant may include an amine group-containing compound, a styryl group-containing compound, or any combination thereof.

For example, the fluorescent dopant may include a compound represented by Formula 501:

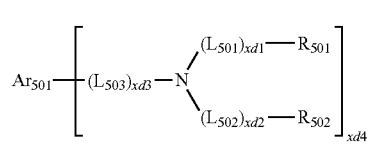

Formula 501 wherein, in Formula 501,
$Ar_{501}$, $L_{501}$ to $L_{503}$, $R_{501}$, and $R_{502}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$,
xd1 to xd3 may each independently be 0, 1, 2, or 3, and xd4 may be 1, 2, 3, 4, 5, or 6.

For example, $Ar_{501}$ in Formula 501 may be a condensed cyclic group (for example, an anthracene group, a chrysene group, or a pyrene group) in which three or more monocyclic groups are condensed together.

In one or more embodiments, xd4 in Formula 501 may be 2.

[Delayed Fluorescence Material]

The emission layer may include a delayed fluorescence material.

In the embodiments described herein, the delayed fluorescence material may be selected from compounds capable of emitting delayed fluorescent light based on a delayed fluorescence emission mechanism.

The delayed fluorescence material included in the emission layer may act as a host or a dopant depending on the type of other materials included in the emission layer.

In one or more embodiments, the difference between the triplet energy level (eV) of the delayed fluorescence material and the singlet energy level (eV) of the delayed fluorescence material may be greater than or equal to 0 eV and less than or equal to 0.5 eV. When the difference between the triplet energy level (eV) of the delayed fluorescence material and the singlet energy level (eV) of the delayed fluorescence material satisfies the above-described range, up-conversion from the triplet state to the singlet state of the delayed fluorescence materials may effectively occur, and thus, the luminescence efficiency of the light-emitting device 120 may be improved.

For example, the delayed fluorescence material may include i) a material including at least one electron donor (for example, a π electron-rich $C_3$-$C_{60}$ cyclic group, such as a carbazole group) and at least one electron acceptor (for example, a sulfoxide group, a cyano group, or a π electron-deficient nitrogen-containing $C_1$-$C_{60}$ cyclic group), and ii) a material including a $C_8$-$C_{60}$ polycyclic group in which two or more cyclic groups are condensed while sharing boron (B).

[Electron Transport Region in Interlayer 123]

The electron transport region may have: i) a single-layered structure consisting of a single layer consisting of a single material, ii) a single-layered structure consisting of a single layer consisting of a plurality of different materials, or iii) a multi-layered structure including a plurality of layers including different materials.

The electron-transporting region may include a buffer layer, a hole-blocking layer, an electron control layer, an electron-transporting layer, an electron injection layer, or any combination thereof.

For example, the electron transport region may have an electron transport layer/electron injection layer structure, a hole-blocking layer/electron transport layer/electron injection layer structure, an electron control layer/electron transport layer/electron injection layer structure, or a buffer layer/electron transport layer/electron injection layer structure, the constituting layers of each structure being sequentially stacked from an emission layer.

In an embodiment, the electron transport region (for example, the buffer layer, the hole-blocking layer, the electron control layer, or the electron transport layer in the electron transport region) may include a metal-free compound including at least one π electron-deficient nitrogen-containing $C_1$-$C_{60}$ cyclic group.

For example, the electron transport region may include a compound represented by Formula 601 below:

$$[Ar_{601}]_{xe11}\text{-}[(L_{601})_{xe1}\text{-}R_{601}]_{xe21} \quad \text{Formula 601}$$

wherein, in Formula 601, $Ar_{601}$ and $L_{601}$ may each independently be a $C_3$-$C_{60}$ carbocyclic group unsubstituted or substituted with at least one $R_{10a}$ or a $C_1$-$C_{60}$ heterocyclic group unsubstituted or substituted with at least one $R_{10a}$, xe11 may be 1, 2, or 3, xe1 may be 0, 1, 2, 3, 4, or 5, $R_{601}$ may be a $C_3$-$C_{60}$ carbocyclic group unsubstituted or substituted with at least one $R_{10a}$, a $C_1$-$C_{60}$ heterocyclic group unsubstituted or substituted with at least one $R_{10a}$, —Si($Q_{601}$)($Q_{602}$)($Q_{603}$), —C(=O)($Q_{601}$), —S(=O)$_2$($Q_{601}$), or —P(=O)($Q_{601}$)($Q_{602}$), $Q_{601}$ to $Q_{603}$ may each be the same as described herein with respect to $Q_1$, xe21 may be 1, 2, 3, 4, or 5, at least one of $Ar_{601}$, $L_{601}$, and $R_{601}$ may each independently be a π electron-deficient nitrogen-containing $C_1$-$C_{60}$ cyclic group unsubstituted or substituted with at least one $R_{10a}$.

For example, when xe11 in Formula 601 is 2 or more, two or more of $Ar_{601}$(s) may be linked to each other via a single bond.

In other embodiments, $Ar_{601}$ in Formula 601 may be a substituted or unsubstituted anthracene group.

In other embodiments, the electron transport region may include a compound represented by Formula 601-1:

Formula 601-1

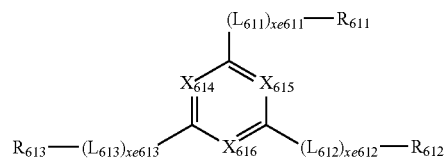

wherein, in Formula 601-1, $X_{614}$ may be N or C($R_{614}$), $X_{615}$ may be N or C($R_{615}$), $X_{616}$ may be N or CR$_{616}$), and at least one of $X_{614}$ to $X_{616}$ may be N, $L_{611}$ to $L_{613}$ may each be the same as described herein with respect to $L_{601}$, xe611 to xe613 may each be the same as described herein with respect to xe1, $R_{611}$ to $R_{613}$ may each be the same as described herein with respect to $R_{601}$, and $R_{614}$ to $R_{616}$ may each independently be hydrogen, deuterium, —F, —Cl, —Br, —I, a hydroxyl group, a cyano group, a nitro group, a $C_1$-$C_{20}$ alkyl group, a $C_1$-$C_{20}$ alkoxy group, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$.

For example, xe1 and xe611 to xe613 in Formulae 601 and 601-1 may each independently be 0, 1, or 2.

A thickness of the electron transport region may be from about 100 Å to about 5,000 Å, for example, about 160 Å to about 4,000 Å. When the electron transport region includes a buffer layer, a hole-blocking layer, an electron control layer, an electron transport layer, or any combination thereof, the thickness of the buffer layer, the hole-blocking layer, or the electron control layer may each independently be from about 20 Å to about 1000 Å, for example, about 30 Å to about 300 Å, and the thickness of the electron transport layer may be from about 100 Å to about 1000 Å, for example, about 150 Å to about 500 Å. When the thickness of the buffer layer, the hole-blocking layer, the electron control layer, the electron transport layer, and/or the electron transport layer are within these ranges, satisfactory electron transporting characteristics may be obtained without a substantial increase in driving voltage.

The electron transport region (for example, the electron transport layer in the electron transport region) may further include, in addition to the materials described above, a metal-containing material.

The metal-containing material may include an alkali metal complex, an alkaline earth metal complex, or any combination thereof. The metal ion of an alkali metal complex may be a Li ion, a Na ion, a K ion, a Rb ion, or a Cs ion, and the metal ion of an alkaline earth metal complex may be a Be ion, a Mg ion, a Ca ion, a Sr ion, or a Ba ion. A ligand coordinated with the metal ion of the alkali metal complex or the alkaline earth-metal complex may include a hydroxyquinoline, a hydroxyisoquinoline, a hydroxybenzoquinoline, a hydroxyacridine, a hydroxyphenanthridine, a hydroxyphenyloxazole, a hydroxyphenylthiazole, a hydroxyphenyloxadiazole, a hydroxyphenylthiadiazole, a hydroxyphenylpyridine, a hydroxyphenylbenzimidazole, a hydroxyphenylbenzothiazole, a bipyridine, a phenanthroline, a cyclopentadiene, or any combination thereof.

For example, the metal-containing material may include a Li complex. The Li complex may include, for example, Compound ET-D1 (LiQ) or ET-D2:

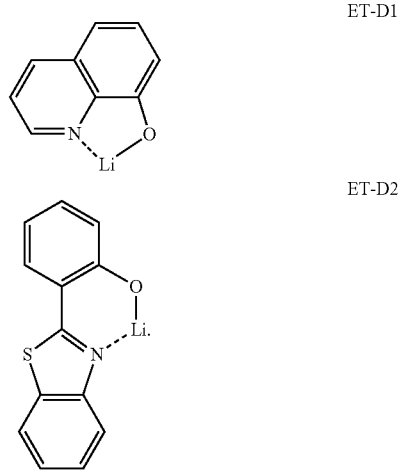

ET-D1

ET-D2

The electron transport region may include an electron injection layer that facilitates the injection of electrons from the second electrode 124. The electron injection layer may directly contact the second electrode 124.

The electron injection layer may have: i) a single-layered structure consisting of a single layer consisting of a single material, ii) a single-layered structure consisting of a single layer consisting of a plurality of different materials, or iii) a multi-layered structure including a plurality of layers including different materials.

The electron injection layer may include an alkali metal, alkaline earth metal, a rare earth metal, an alkali metal-containing compound, alkaline earth metal-containing compound, a rare earth metal-containing compound, an alkali metal complex, an alkaline earth metal complex, a rare earth metal complex, or any combination thereof.

The alkali metal may include Li, a Na, K, Rb, Cs, or any combination thereof. The alkaline earth metal may include Mg, Ca, Sr, Ba, or any combination thereof. The rare earth metal may include Sc, Y, Ce, Tb, Yb, Gd, or any combination thereof.

The alkali metal-containing compound, the alkaline earth metal-containing compound, and the rare earth metal-containing compound may be oxides, halides (for example, fluorides, chlorides, bromides, or iodides), or tellurides of the alkali metal, the alkaline earth metal, and the rare earth metal, or any combination thereof.

The alkali metal-containing compound may include: alkali metal oxides, such as $Li_2O$, $Cs_2O$, or $K_2O$; alkali metal halides, such as LiF, a naF, CsF, KF, LiI, a NaI, CsI, or KI; or any combination thereof. The alkaline earth metal-containing compound may include an alkaline earth metal compound, such as BaO, SrO, CaO, $Ba_xSr_{1-x}O$ (wherein x is a real number satisfying the condition of $0<x<1$), $Ba_xCa_{1-x}O$ (wherein x is a real number satisfying the condition of $0<x<1$), or the like. The rare earth metal-containing compound may include $YbF_3$, $ScF_3$, $Sc_2O_3$, $Y_2O_3$, $Ce_2O_3$, $GdF_3$, $TbF_3$, $YbI_3$, $ScI_3$, $TbI_3$, or any combination thereof. In one or more embodiments, the rare earth metal-containing compound may include lanthanide metal telluride. Examples of the lanthanide metal telluride are LaTe, CeTe, PrTe, NdTe, PmTe, SmTe, EuTe, GdTe, TbTe, DyTe, HoTe, ErTe, TmTe, YbTe, LuTe, $La_2Te_3$, $Ce_2Te_3$, $Pr_2Te_3$, $Nd_2Te_3$, $Pm_2Te_3$, $Sm_2Te_3$, $Eu_2Te_3$, $Gd_2Te_3$, $Tb_2Te_3$, $Dy_2Te_3$, $Ho_2Te_3$, $Er_2Te_3$, $Tm_2Te_3$, $Yb_2Te_3$, and $Lu_2Te_3$.

The alkali metal complex, the alkaline earth-metal complex, and the rare earth metal complex may include i) one of ions of the alkali metal, the alkaline earth metal, and the rare earth metal and ii), as a ligand bonded to the metal ion, for example, hydroxyquinoline, hydroxyisoquinoline, hydroxybenzoquinoline, hydroxyacridine, hydroxyphenanthridine, hydroxyphenyloxazole, hydroxyphenylthiazole, hydroxyphenyloxadiazole, hydroxyphenylthiadiazole, hydroxyphenylpyridine, hydroxyphenyl benzimidazole, hydroxyphenylbenzothiazole, bipyridine, phenanthroline, cyclopentadiene, or any combination thereof.

The electron injection layer may consist of an alkali metal, an alkaline earth metal, a rare earth metal, an alkali metal-containing compound, an alkaline earth metal-containing compound, a rare earth metal-containing compound, an alkali metal complex, an alkaline earth metal complex, a rare earth metal complex, or any combination thereof, as described above. In one or more embodiments, the electron injection layer may further include an organic material (for example, a compound represented by Formula 601).

In one or more embodiments, the electron injection layer may consist of: i) an alkali metal-containing compound (for example, an alkali metal halide); or ii) a) an alkali metal-containing compound (for example, an alkali metal halide), and b) an alkali metal, an alkaline earth metal, a rare earth metal, or any combination thereof. For example, the electron injection layer may be a KI:Yb co-deposited layer, an RbI:Yb co-deposited layer, or the like.

When the electron injection layer further includes an organic material, alkali metal, alkaline earth metal, rare earth metal, an alkali metal-containing compound, an alkaline earth metal-containing compound, a rare earth metal-containing compound, alkali metal complex, alkaline earth-metal complex, rare earth metal complex, or any combination thereof may be uniformly or non-uniformly dispersed in a matrix including the organic material.

A thickness of the electron injection layer may be in a range of about 1 Å to about 100 Å, and, for example, about 3 Å to about 90 Å. When the thickness of the electron injection layer is within the ranges described above, satisfactory electron injection characteristics may be obtained without a substantial increase in driving voltage.

[Second Electrode 124]

The second electrode 124 may be located on the interlayer 123 having such a structure. The second electrode 124 may be a cathode, which is an electron injection electrode, and as the material for the second electrode 124, a metal, an alloy, an electrically conductive compound, or any combination thereof, each having a low work function, may be used.

The second electrode 124 may include lithium (Li), silver (Ag), magnesium (Mg), aluminum (Al), aluminum-lithium (Al—Li), calcium (Ca), magnesium-indium (Mg—In), magnesium-silver (Mg—Ag), ytterbium (Yb), silver-ytterbium (Ag—Yb), ITO, IZO, or any combination thereof. The second electrode 124 may be a transmissive electrode, a semi-transmissive electrode, or a reflective electrode.

The second electrode 124 may have a single-layered structure or a multi-layered structure including two or more layers.

[Capping Layer]

A first capping layer may be located outside the first electrode 122, and/or a second capping layer may be located outside the second electrode 124. In detail, the light-emitting device 120 may have a structure in which the first capping layer, the first electrode 122, the interlayer 123, and the second electrode 124 are sequentially stacked in this stated order, a structure in which the first electrode 122, the interlayer 123, the second electrode 124, and the second capping layer are sequentially stacked in this stated order, or a structure in which the first capping layer, the first electrode 122, the interlayer 123, the second electrode 124, and the second capping layer are sequentially stacked in this stated order.

Light generated in an emission layer of the interlayer 123 of the light-emitting device 120 may be extracted toward the outside through the first electrode 122, which is a semi-transmissive electrode or a transmissive electrode, and the first capping layer or light generated in an emission layer of the interlayer 123 of the light-emitting device 120 may be extracted toward the outside through the second electrode 124, which is a semi-transmissive electrode or a transmissive electrode, and the second capping layer.

The first capping layer and the second capping layer may increase external emission efficiency according to the principle of constructive interference. Accordingly, the light extraction efficiency of the light-emitting device 120 is increased, so that the luminescence efficiency of the light-emitting device 120 may be improved.

Each of the first capping layer and the second capping layer may include a material having a refractive index of 1.6 or more (at 589 nm).

The first capping layer and the second capping layer may each independently be an organic capping layer including an organic material, an inorganic capping layer including an inorganic material, or a composite capping layer including an organic material and an inorganic material.

At least one of the first capping layer and the second capping layer may each independently include carbocyclic compounds, heterocyclic compounds, amine group-containing compounds, porphyrin derivatives, phthalocyanine derivatives, naphthalocyanine derivatives, alkali metal complexes, alkaline earth metal complexes, or any combination thereof. Optionally, the carbocyclic compound, the heterocyclic compound, and the amine group-containing compound may be substituted with a substituent including O, N, S, Se, Si, F, Cl, Br, I, or any combination thereof. In one or more embodiments, at least one of the first capping layer and the second capping layer may each independently include an amine group-containing compound.

For example, at least one of the first capping layer and the second capping layer may each independently include a compound represented by Formula 201, a compound represented by Formula 202, or any combination thereof.

[Manufacturing Method]

The layers included in the hole transport region, the emission layer, and the layers included in the electron transport region may be formed in a certain region by using various methods such as vacuum deposition, spin coating, casting, Langmuir-Blodgett (LB) deposition, ink-jet printing, laser-printing, laser-induced thermal imaging, and the like.

When layers constituting the hole transport region, an emission layer, and layers constituting the electron transport region are formed by vacuum deposition, the deposition may be performed at a deposition temperature of about 100° C. to about 500° C., a vacuum degree of about $10^{-8}$ torr to about $10^{-3}$ torr, and a deposition speed of about 0.01 Å/sec to about 100 Å/sec, depending on a material to be included in a layer to be formed and the structure of a layer to be formed.

When layers constituting the hole transport region, an emission layer, and layers constituting the electron transport region are formed by spin coating, the spin coating may be performed at a coating speed of about 2,000 rpm to about 5,000 rpm and at a heat treatment temperature of about 80° C. to about 200° C. by taking into account a material to be included in a layer to be formed and the structure of a layer to be formed.

Definition of Terms

The term "$C_3$-$C_{60}$ carbocyclic group" as used herein refers to a cyclic group consisting of carbon only as a ring-forming atom and having three to sixty carbon atoms, and the term "$C_1$-$C_{60}$ heterocyclic group" as used herein refers to a cyclic group that has one to sixty carbon atoms and further has, in addition to carbon, a heteroatom as a ring-forming atom. The $C_3$-$C_{60}$ carbocyclic group and the $C_1$-$C_{60}$ heterocyclic group may each be a monocyclic group consisting of one ring or a polycyclic group in which two or more rings are condensed with each other. For example, the $C_1$-$C_{60}$ heterocyclic group has 3 to 61 ring-forming atoms.

The "cyclic group" as used herein may include the $C_3$-$C_{60}$ carbocyclic group, and the $C_1$-$C_{60}$ heterocyclic group.

The term "π electron-rich $C_3$-$C_{60}$ cyclic group" as used herein refers to a cyclic group that has three to sixty carbon atoms and does not include *—N=*' as a ring-forming moiety, and the term "π electron-deficient nitrogen-containing $C_1$-$C_{60}$ cyclic group" as used herein refers to a heterocyclic group that has one to sixty carbon atoms and includes *—N=*' as a ring-forming moiety.

For example, the $C_3$-$C_{60}$ carbocyclic group may be i) group T1 or ii) a condensed cyclic group in which two or more groups T1 are condensed with each other (for example, a cyclopentadiene group, an adamantane group, a norbornane group, a benzene group, a pentalene group, a naphthalene group, an azulene group, an indacene group, an acenaphthylene group, a phenalene group, a phenanthrene group, an anthracene group, a fluoranthene group, a triphenylene group, a pyrene group, a chrysene group, a perylene group, a pentaphene group, a heptalene group, a naphthacene group, a picene group, a hexacene group, a pentacene group, a rubicene group, a coronene group, an ovalene group, an indene group, a fluorene group, a spiro-bifluorene group, a benzofluorene group, an indenophenanthrene group, or an indenoanthracene group), the $C_1$-$C_{60}$ heterocyclic group may be i) group T2, ii) a condensed cyclic group in which two or more groups T2 are condensed with each other, or iii) a condensed cyclic group in which at least one group T2 and at least one group T1 are condensed with each other (for example, a pyrrole group, a thiophene group, a furan group, an indole group, a benzoindole group, a naphthoindole group, an isoindole group, a benzoisoindole group, a naphthoisoindole group, a benzosilole group, a benzothiophene group, a benzofuran group, a carbazole group, a dibenzosilole group, a dibenzothiophene group, a dibenzofuran group, an indenocarbazole group, an indolocarbazole group, a benzofurocarbazole group, a benzothienocarbazole group, a benzosilolocarbazole group, a benzoindolocarbazole group, a benzocarbazole group, a benzonaphthofuran group, a benzonaphthothiophene group, a benzonaphthosilole group, a benzofurodibenzofuran group, a benzofurodibenzothiophene group, a benzothienodibenzothiophene group, a pyrazole group, an imidazole group, a triazole group, an oxazole group, an isoxazole group, an oxadiazole group, a thiazole group, an isothiazole group, a thiadiazole group, a benzopyrazole group, a benzimidazole group, a benzoxazole group, a benzoisoxazole group, a benzothiazole group, a benzoisothiazole group, a pyridine group, a pyrimidine group, a pyrazine group, a pyridazine group, a triazine group, a quinoline group, an isoquinoline group, a benzoquinoline group, a benzoisoquinoline group, a quinoxaline group, a benzoquinoxaline group, a quinazoline group, a benzoquinazoline group, a phenanthroline group, a cinnoline group, a phthalazine group, a naphthyridine group, an imidazopyridine group, an imidazopyrimidine group, an imidazotriazine group, an imidazopyrazine group, an imidazopyridazine group, an azacarbazole group, an azafluorene group, an azadibenzosilole group, an azadibenzothiophene group, an azadibenzofuran group, etc.), the π electron-rich $C_3$-$C_{60}$ cyclic group may be i) group T1, ii) a condensed cyclic group in which two or more groups T1 are condensed with each other, iii) group T3, iv) a condensed cyclic group in which two or more groups T3 are condensed with each other, or v) a condensed cyclic group in which at least one group T3 and at least one group T1 are condensed with each other (for example, the $C_3$-$C_{60}$ carbocyclic group, a 1H-pyrrole group, a silole group, a borole group, a 2H-pyrrole group, a 3H-pyrrole group, a thiophene group, a furan group, an indole group, a benzoindole group, a naphthoindole group, an isoindole group, a benzoisoindole group, a naphthoisoindole group, a benzosilole group, a benzothiophene group, a benzofuran group, a carbazole group, a dibenzosilole group, a dibenzothiophene group, a dibenzofuran group, an indenocarbazole group, an indolocarbazole group, a benzofurocarbazole group, a benzothienocarbazole group, a benzosilolocarbazole group, a benzoindolocarbazole group, a benzocarbazole group, a benzonaphthofuran group, a benzonaphthothiophene group, a benzonaphthosilole group, a benzofurodibenzofuran group, a benzofurodibenzothiophene group, a benzothienodibenzothiophene group, etc.), the π electron-deficient nitrogen-containing $C_1$-$C_{60}$ cyclic group may be i) group T4, ii) a condensed cyclic group in which two or more groups T4 are condensed with each other, iii) a condensed cyclic group in which at least one group T4 and at least one group T1 are condensed with each other, iv) a condensed cyclic group in which at least one group T4 and at least one group T3 are condensed with each other, or v) a condensed cyclic group in which at least one group T4, at least one group T1, and at least one group T3 are condensed with one another (for example, a pyrazole group, an imidazole group, a triazole group, an oxazole group, an isoxazole group, an oxadiazole group, a thiazole group, an isothiazole group, a thiadiazole group, a benzopyrazole group, a benzimidazole group, a benzoxazole group, a benzoisoxazole group, a benzothiazole group, a benzoisothiazole group, a pyridine group, a pyrimidine group, a pyrazine group, a pyridazine group, a triazine group, a quinoline group, an isoquinoline group, a benzoquinoline group, a benzoisoquinoline group, a quinoxaline group, a benzoquinoxaline group, a quinazoline group, a benzoquinazoline group, a phenanthroline group, a cinnoline group, a phthalazine group, a naphthyridine group, an imidazopyridine group, an imidazopyrimidine group, an imidazotriazine group, an imidazopyrazine group, an imidazopyridazine group, an azacarbazole group, an azafluorene group, an azadibenzosilole group, an azadibenzothiophene group, an azadibenzofuran group, etc.), group T1 may be a cyclopropane group, a cyclobutane group, a cyclopentane group, a cyclohexane group, a cycloheptane group, a cyclooctane group, a cyclobutene group, a cyclopentene group, a cyclopentadiene group, a cyclohexene group, a cyclohexadiene group, a cycloheptene group, an adamantane group, a norbornane (or a bicyclo[2.2.1]heptane) group, a norbornene group, a bicyclo[1.1.1]pentane group, a bicyclo[2.1.1]hexane group, a bicyclo[2.2.2]octane group, or a benzene group, group T2 may be a furan group, a thiophene group, a 1H-pyrrole group, a silole group, a borole group, a 2H-pyrrole group, a 3H-pyrrole group, an imidazole group, a pyrazole group, a triazole group, a tetrazole group, an oxazole group, an isoxazole group, an oxadiazole group, a thiazole group, an isothiazole group, a thiadiazole group, an azasilole group, an azaborole group, a pyridine group, a pyrimidine group, a pyrazine group, a pyridazine group, a triazine group, a tetrazine group, a pyrrolidine group, an imidazolidine group, a dihydropyrrole group, a piperidine group, a tetrahydropyridine group, a dihydropyridine group, a hexahydropyrimidine group, a tetrahydropyrimidine group, a dihydropyrimidine group, a piperazine group, a tetrahydropyrazine group, a dihydropyrazine group, a tetrahydropyridazine group, or a dihydropyridazine group, group T3 may be a furan group, a thiophene group, a 1H-pyrrole group, a silole group, or a borole group, and group T4 may be a 2H-pyrrole group, a 3H-pyrrole group, an imidazole group, a pyrazole group, a triazole group, a tetrazole group, an oxazole group, an isoxazole group, an oxadiazole group, a thiazole group, an isothiazole group, a thiadiazole group, an azasilole group, an azaborole group, a pyridine group, a pyrimidine group, a pyrazine group, a pyridazine group, a triazine group, or a tetrazine group.

The terms "the cyclic group, the $C_3$-$C_{60}$ carbocyclic group, the $C_1$-$C_{60}$ heterocyclic group, the π electron-rich $C_3$-$C_{60}$ cyclic group, or the π electron-deficient nitrogen-containing $C_1$-$C_{60}$ cyclic group" as used herein refer to a group condensed to any cyclic group, a monovalent group, or a polyvalent group (for example, a divalent group, a trivalent group, a tetravalent group, etc.) according to the structure of a formula for which the corresponding term is used. For example, the "benzene group" may be a benzo group, a phenyl group, a phenylene group, or the like, which may be easily understood by one of ordinary skill in the art according to the structure of a formula including the "benzene group."

Examples of the monovalent $C_3$-$C_{60}$ carbocyclic group and the monovalent $C_1$-$C_{60}$ heterocyclic group may include a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, and a monovalent non-aromatic condensed heteropolycyclic group. Examples of the divalent $C_3$-$C_{60}$ carbocyclic group and the divalent $C_1$-$C_{60}$ heterocyclic group may include a $C_3$-$C_{10}$ cycloalkylene group, a $C_1$-$C_{10}$ heterocycloalkylene group, a $C_3$-$C_{10}$ cycloalkenylene group, a $C_1$-$C_{10}$ heterocycloalkenylene group, a $C_6$-$C_{60}$ arylene group, a $C_1$-$C_{60}$ heteroarylene group, a divalent non-aromatic condensed polycyclic group, and a divalent non-aromatic condensed heteropolycyclic group.

The term "$C_1$-$C_{60}$ alkyl group" as used herein refers to a linear or branched aliphatic hydrocarbon monovalent group that has one to sixty carbon atoms, and specific examples thereof are a methyl group, an ethyl group, an n-propyl group, an isopropyl group, an n-butyl group, a sec-butyl group, an isobutyl group, a tert-butyl group, an n-pentyl group, a tert-pentyl group, a neopentyl group, an isopentyl group, a sec-pentyl group, a 3-pentyl group, a sec-isopentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, and a tert-decyl group. The term "$C_1$-$C_{60}$ alkylene group" as used herein refers to a divalent group having the same structure as the $C_1$-$C_{60}$ alkyl group.

The term "$C_2$-$C_{60}$ alkenyl group" as used herein refers to a monovalent hydrocarbon group having at least one carbon-carbon double bond in the middle or at the terminus of the $C_2$-$C_{60}$ alkyl group, and examples thereof are an ethenyl group, a propenyl group, and a butenyl group. The term "$C_2$-$C_{60}$ alkenylene group" as used herein refers to a divalent group having the same structure as the $C_2$-$C_{60}$ alkenyl group.

The term "$C_2$-$C_{60}$ alkynyl group" as used herein refers to a monovalent hydrocarbon group having at least one carbon-carbon triple bond in the middle or at the terminus of the $C_2$-$C_{60}$ alkyl group, and examples thereof include an ethynyl group and a propynyl group.

The term "$C_2$-$C_{60}$ alkynylene group" as used herein refers to a divalent group having the same structure as the $C_2$-$C_{60}$ alkynyl group.

The term "$C_1$-$C_{60}$ alkoxy group" as used herein refers to a monovalent group represented by —$OA_{101}$ (wherein $A_{101}$ is the $C_1$-$C_{60}$ alkyl group), and examples thereof include a methoxy group, an ethoxy group, and an isopropyloxy group.

The term "$C_3$-$C_{10}$ cycloalkyl group" as used herein refers to a monovalent saturated hydrocarbon cyclic group having 3 to 10 carbon atoms, and examples thereof are a cyclopropyl group, a cyclobutyl group, a cyclopentyl group, a cyclohexyl group, a cycloheptyl group, a cyclooctyl group, an adamantanyl group, a norbornanyl group (or bicyclo[2.2.1]heptyl group), a bicyclo[1.1.1]pentyl group, a bicyclo[2.1.1]hexyl group, and a bicyclo[2.2.2]octyl group. The term "$C_3$-$C_{10}$ cycloalkylene group" as used herein refers to a divalent group having the same structure as the $C_3$-$C_{10}$ cycloalkyl group.

The term "$C_1$-$C_{10}$ heterocycloalkyl group" as used herein refers to a monovalent cyclic group of 1 to 10 carbon atoms, further including, in addition to carbon atoms, at least one heteroatom, as ring-forming atoms, and specific examples are a 1,2,3,4-oxatriazolidinyl group, a tetrahydrofuranyl group, and a tetrahydrothiophenyl group. The term "$C_1$-$C_{10}$ heterocycloalkylene group" as used herein refers to a divalent group having the same structure as the $C_1$-$C_{10}$ heterocycloalkyl group.

The term $C_3$-$C_{10}$ cycloalkenyl group used herein refers to a monovalent cyclic group that has three to ten carbon atoms and at least one carbon-carbon double bond in the ring thereof and no aromaticity, and specific examples thereof are a cyclopentenyl group, a cyclohexenyl group, and a cycloheptenyl group. The term "$C_3$-$C_{10}$ cycloalkenylene group" as used herein refers to a divalent group having the same structure as the $C_3$-$C_{10}$ cycloalkenyl group.

The term "$C_1$-$C_{10}$ heterocycloalkenyl group" as used herein refers to a monovalent cyclic group of 1 to 10 carbon atoms, further including, in addition to carbon atoms, at least one heteroatom, as ring-forming atoms, and having at least one carbon-carbon double bond in the cyclic structure thereof. Examples of the $C_1$-$C_{10}$ heterocycloalkenyl group include a 4,5-dihydro-1,2,3,4-oxatriazolyl group, a 2,3-dihydrofuranyl group, and a 2,3-dihydrothiophenyl group. The term "$C_1$-$C_{10}$ heterocycloalkenylene group" as used herein refers to a divalent group having the same structure as the $C_1$-$C_{10}$ heterocycloalkenyl group.

The term "$C_6$-$C_{60}$ aryl group" as used herein refers to a monovalent group having a carbocyclic aromatic system of 6 to 60 carbon atoms, and the term "$C_6$-$C_{60}$ arylene group" as used herein refers to a divalent group having a carbocyclic aromatic system of 6 to 60 carbon atoms. Examples of the $C_6$-$C_{60}$ aryl group are a phenyl group, a pentalenyl group, a naphthyl group, an azulenyl group, an indacenyl group, an acenaphthyl group, a phenalenyl group, a phenanthrenyl group, an anthracenyl group, a fluoranthenyl group, a triphenylenyl group, a pyrenyl group, a chrysenyl group, a perylenyl group, a pentaphenyl group, a heptalenyl group, a naphthacenyl group, a picenyl group, a hexacenyl group, a pentacenyl group, a rubicenyl group, a coronenyl group, and an ovalenyl group. When the $C_6$-$C_{60}$ aryl group and the $C_6$-$C_{60}$ arylene group each include two or more rings, the rings may be condensed with each other.

The term "$C_1$-$C_{60}$ heteroaryl group" as used herein refers to a monovalent group having a heterocyclic aromatic system of 1 to 60 carbon atoms, further including, in addition to carbon atoms, at least one heteroatom, as ring-forming atoms. The term "$C_1$-$C_{60}$ heteroarylene group" as used herein refers to a divalent group having a heterocyclic aromatic system of 1 to 60 carbon atoms, further including, in addition to carbon atoms, at least one heteroatom, as ring-forming atoms. Examples of the $C_1$-$C_{60}$ heteroaryl group are a pyridinyl group, a pyrimidinyl group, a pyrazinyl group, a pyridazinyl group, a triazinyl group, a quinolinyl group, a benzoquinolinyl group, an isoquinolinyl group, a benzoisoquinolinyl group, a quinoxalinyl group, a benzoquinoxalinyl group, a quinazolinyl group, a benzoquinazolinyl group, a cinnolinyl group, a phenanthrolinyl group, a phthalazinyl group, and a naphthyridinyl group. When the $C_1$-$C_{60}$ heteroaryl group and the $C_1$-$C_{60}$ heteroarylene group each include two or more rings, the rings may be condensed with each other.

The term "monovalent non-aromatic condensed polycyclic group" as used herein refers to a monovalent group (for example, having 8 to 60 carbon atoms) having two or more rings condensed to each other, only carbon atoms as ring-forming atoms, and no aromaticity in its entire molecular structure. Examples of the monovalent non-aromatic condensed polycyclic group are an indenyl group, a fluorenyl group, a spiro-bifluorenyl group, a benzofluorenyl group, an indenophenanthrenyl group, and an indeno anthracenyl group. The term "divalent non-aromatic condensed polycyclic group" as used herein refers to a divalent group having the same structure as the monovalent non-aromatic condensed polycyclic group described above.

The term "monovalent non-aromatic condensed heteropolycyclic group" as used herein refers to a monovalent group (for example, having 1 to 60 carbon atoms) having two or more rings condensed to each other, further including, in addition to carbon atoms, at least one heteroatom, as ring-forming atoms, and having non-aromaticity in its entire molecular structure. Examples of the monovalent non-aromatic condensed heteropolycyclic group include a pyrrolyl group, a thiophenyl group, a furanyl group, an indolyl group, a benzoindolyl group, a naphtho indolyl group, an isoindolyl group, a benzoisoindolyl group, a naphthoisoindolyl group, a benzosilolyl group, a benzothiophenyl group, a benzofuranyl group, a carbazolyl group, a dibenzosilolyl group, a dibenzothiophenyl group, a dibenzofuranyl group, an azacarbazolyl group, an azafluorenyl group, an azadibenzosilolyl group, an azadibenzothiophenyl group, an azadibenzofuranyl group, a pyrazolyl group, an imidazolyl group, a triazolyl group, a tetrazolyl group, an oxazolyl group, an isoxazolyl group, a thiazolyl group, an isothiazolyl group, an oxadiazolyl group, a thiadiazolyl group, a benzopyrazolyl group, a benzimidazolyl group, a benzoxazolyl group, a benzothiazolyl group, a benzoxadiazolyl group, a benzothiadiazolyl group, an imidazopyridinyl group, an imidazopyrimidinyl group, an imidazotriazinyl group, an imidazopyrazinyl group, an imidazopyridazinyl group, an indenocarbazolyl group, an indolocarbazolyl group, a benzofurocarbazolyl group, a benzothienocarbazolyl group, a benzosilolocarbazolyl group, a benzoindolocarbazolyl group, a benzocarbazolyl group, a benzonaphthofuranyl group, a benzonaphthothiophenyl group, a benzonaphthosilolyl group, a benzofurodibenzofuranyl group, a benzofurodibenzothiophenyl group, and a benzothienodibenzothiophenyl group. The term "divalent non-aromatic condensed heteropolycyclic group" as used herein refers to a divalent group having the same structure as the monovalent non-aromatic condensed heteropolycyclic group described above.

The term "$C_6$-$C_{60}$ aryloxy group" as used herein indicates —$OA_{102}$ (wherein $A_{102}$ is the $C_6$-$C_{60}$ aryl group), and the term "$C_6$-$C_{60}$ arylthio group" as used herein indicates —$SA_{103}$ (wherein $A_{103}$ is the $C_6$-$C_{60}$ aryl group).

The term "$C_7$-$C_{60}$ aryl alkyl group" used herein refers to -$A_{104}A_{105}$ (where $A_{104}$ may be a $C_1$-$C_{54}$ alkylene group, and $A_{105}$ may be a $C_6$-$C_{59}$ aryl group), and the term "$C_2$-$C_{60}$ heteroaryl alkyl group" used herein refers to -$A_{106}A_{107}$ (where $A_{106}$ may be a $C_1$-$C_{59}$ alkylene group, and $A_{107}$ may be a $C_1$-$C_{59}$ heteroaryl group).

The term "$R_{10a}$" as used herein refers to:
deuterium (-D), —F, —Cl, —Br, —I, a hydroxyl group, a cyano group, or a nitro group,
a $C_1$-$C_{60}$ alkyl group, a $C_2$-$C_{60}$ alkenyl group, a $C_2$-$C_{60}$ alkynyl group, or a $C_1$-$C_{60}$ alkoxy group, each unsubstituted or substituted with deuterium, —F, —Cl, —Br, —I, a hydroxyl group, a cyano group, a nitro group, a $C_3$-$C_{60}$ carbocyclic group, a $C_1$-$C_{60}$ heterocyclic group, a $C_6$-$C_{60}$ aryloxy group, a $C_6$-$C_{60}$ arylthio group, a $C_7$-$C_{60}$ aryl alkyl group, a $C_2$-$C_{60}$ heteroaryl alkyl group, —Si($Q_{11}$)($Q_{12}$)($Q_{13}$), —N($Q_{11}$)($Q_{12}$), —B($Q_{11}$)($Q_{12}$), —C(=O)($Q_{11}$), —S(=O)$_2$($Q_{11}$), —P(=O)($Q_{11}$)($Q_{12}$), or any combination thereof, a $C_3$-$C_{60}$ carbocyclic group, a $C_1$-$C_{60}$ heterocyclic group, a $C_6$-$C_{60}$ aryloxy group, a $C_6$-$C_{60}$ arylthio group, a $C_7$-$C_{60}$ arylalkyl group, or a $C_2$-$C_{60}$ heteroarylalkyl group, each unsubstituted or substituted with deuterium, —F, —Cl, —Br, —I, a hydroxyl group, a cyano group, a nitro group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{60}$ carbocyclic group, a $C_1$-$C_{60}$ heterocyclic group, a $C_6$-$C_{60}$ aryloxy group, a $C_6$-$C_{60}$ arylthio group, a $C_7$-$C_{60}$ arylalkyl group, a $C_2$-$C_{60}$ heteroarylalkyl group, —Si($Q_{21}$)($Q_{22}$)($Q_{23}$), —N($Q_{21}$)($Q_{22}$), —B($Q_{21}$)($Q_{22}$), —C(=O)($Q_{21}$), —S(=O)$_2$($Q_{21}$), —P(=O)($Q_{21}$)($Q_{22}$), or any combination thereof; or —Si($Q_{31}$)($Q_{32}$)($Q_{33}$), —N($Q_{31}$)($Q_{32}$), —B($Q_{31}$)($Q_{32}$), —C(=O)($Q_{31}$), —S(=O)$_2$($Q_{31}$), or —P(=O)($Q_{31}$)($Q_{32}$).

$Q_1$ to $Q_3$, $Q_{11}$ to $Q_{13}$, $Q_{21}$ to $Q_{23}$, and $Q_{31}$ to $Q_{33}$ used herein may each independently be: hydrogen; deuterium; —F; —Cl; —Br; —I; a hydroxyl group; a cyano group; a nitro group; a $C_1$-$C_{60}$ alkyl group; a $C_2$-$C_{60}$ alkenyl group; a $C_2$-$C_{60}$ alkynyl group; a $C_1$-$C_{60}$ alkoxy group; a $C_3$-$C_{60}$ carbocyclic group or a $C_1$-$C_{60}$ heterocyclic group, each unsubstituted or substituted with deuterium, —F, a cyano group, a $C_1$-$C_{60}$ alkyl group, a $C_1$-$C_{60}$ alkoxy group, a phenyl group, a biphenyl group, or any combination thereof, a $C_7$-$C_{60}$ aryl alkyl group; or a $C_2$-$C_{60}$ heteroaryl alkyl group.

The term "heteroatom" as used herein refers to any atom other than a carbon atom. Examples of the heteroatom are O, S, N, P, Si, B, Ge, Se, and any combinations thereof.

The term "the third-row transition metal" used herein includes hafnium (Hf), tantalum (Ta), tungsten (W), rhenium (Re), osmium (Os), iridium (Ir), platinum (Pt), gold (Au), etc.

"Ph" as used herein refers to a phenyl group, "Me" as used herein refers to a methyl group, "Et" as used herein refers to an ethyl group, "ter-Bu" or "Bu$^t$" as used herein refers to a tert-butyl group, and "OMe" as used herein refers to a methoxy group.

The term "biphenyl group" as used herein refers to "a phenyl group substituted with a phenyl group." In other words, the "biphenyl group" is a substituted phenyl group having a $C_6$-$C_{60}$ aryl group as a substituent.

The term "terphenyl group" as used herein refers to "a phenyl group substituted with a biphenyl group". In other words, the "terphenyl group" is a substituted phenyl group having, as a substituent, a $C_6$-$C_{60}$ aryl group substituted with a $C_6$-$C_{60}$ aryl group.

The maximum number of carbon atoms in this substituent definition section is an example only. In an embodiment, the maximum carbon number of 60 in the $C_1$-$C_{60}$ alkyl group is an example, and the definition of the alkyl group is equally applied to a $C_1$-$C_{20}$ alkyl group. The same applies to other cases.

* and *' as used herein, unless defined otherwise, each refer to a binding site to a neighboring atom in a corresponding formula.

Hereinafter, manufacture of a display apparatus according to an embodiment and evaluation results thereof will be described with reference to Examples.

Preparation of Ink Composition

Ink Composition 1 (Comparative Example 1)

0.1 wt % of photoinitiator, 10 wt % of scatterer $TiO_2$ (about 100 nm to about 200 nm), 100 wt % of monomer (1,6-hexanediol diacrylate), and 2 wt % of dispersant (—[$CH_2$—CH(COONa)—]$_m$/molecular weight: about 500 to about 15000) were mixed to prepare an ink composition.

Ink Composition 2 (Example 1: Monomer Induces Low Refractive Index)

0.1 wt % of photoinitiator, 10 wt % of scatterer $TiO_2$ (about 100 nm to about 200 nm), 100 wt % of the monomer of Compound 100, and 2 wt % dispersant (—[$CH_2$—CH(COONa)—]$_m$/molecular weight: about 500 to about 15000) were mixed to prepare an ink composition.

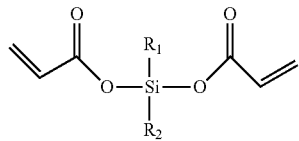

100
$R_1$, $R_2$: $CH_3$

Ink Composition 3 (Example 2: Dispersant Induces Low Refractive Index)

0.1 wt % of photoinitiator, 10 wt % of scatterer $TiO_2$ (about 100 nm to about 200 nm), 100 wt % of monomer (1,6-hexanediol diacrylate), and 2 wt % of dispersant (—[C(Si($CH_3$)$_3$)H—CH(COONa)—]$_n$/molecular weight: about 800 to about 30000) were mixed to prepare an ink composition.

Ink Composition 4 (Example 3: Inclusion of Low Refractive Index Particles)

0.1 wt % of photoinitiator, 10 wt % of scatterer $TiO_2$ (about 100 nm to about 200 nm), 100 wt % of the monomer of Compound 100, 2 wt % of dispersant (—[$CH_2$—CH(COONa)—]$_m$/molecular weight: about 500 to about 15000), 5 wt % of $SiO_2$ particles (refractive index: 1.5/70 to 150 nm), and 3 wt % of stearic acid (acid value: 6 mg KOH/g) were mixed to prepare an ink composition.

Comparative Example 2

First, as shown in FIG. 2A, the light-emitting device 120 is formed on the first substrate 110, and is covered with thin-film encapsulation layer 130. As the emission layer included in the interlayer 123 of the light-emitting device 120, a blue emission layer was formed as a common layer.

Next, the black matrixes 250 and the color filter layers 220R, 220G, and 220B were formed on the second substrate 210 at positions corresponding to a corresponding light-emitting device.

Next, as shown in FIG. 2C, the low refractive index layer 260 having the refractive index 1.2 was formed on the color filter layers 220R, 220G, and 220B and the black matrix 250, and then, the inorganic capping layer 270 was formed thereon.

Next, as illustrated in FIG. 2D, a bank composition was patterned remaining in between the color filter layers 220R, 220G, and 220B of pixels.

Thereafter, as shown in FIG. 2E, the quantum dot layers 230R and 230G were formed in the red pixel and the green pixel by an inkjet process, and in the case of blue pixel, the scattering layer 230W was formed using the ink composition of Comparative Example 1.

Next, as shown in FIG. 2F, the filler 300 was applied between the first substrate 110 and the second substrate 210, which were then combined to each other to thereby complete manufacture of a display apparatus provided with the light-emitting device 120, the quantum dot layers 230R and 230G, and the color filter layers 220R, 220G, and 220B.

Example 4

A display apparatus was manufactured in the same manner as in Comparative Example 2, except that the ink composition of Example 1 was used instead of the ink composition of Comparative Example 1 when forming the scattering layer 230W.

Example 5

A display apparatus was manufactured in the same manner as in Comparative Example 2, except that the ink composition of Example 2 was used instead of the ink composition of Comparative Example 1 when forming the scattering layer 230W.

Example 6

A display apparatus was manufactured in the same manner as in Comparative Example 2, except that the ink composition of Example 3 was used instead of the ink composition of Comparative Example 1 when forming the scattering layer 230W.

The refractive index of the scattering layer 230W of the display apparatus of each of Comparative Example 2 and Examples 4 to 6 is shown in Table 1.

TABLE 1

|  | Refractive index of scattering layer 230W |
| --- | --- |
| Comparative Example 2 | 1.6 |
| Example 4 | 1.2 |
| Example 5 | 1.3 |
| Example 6 | 1.1 |

Figure 4:
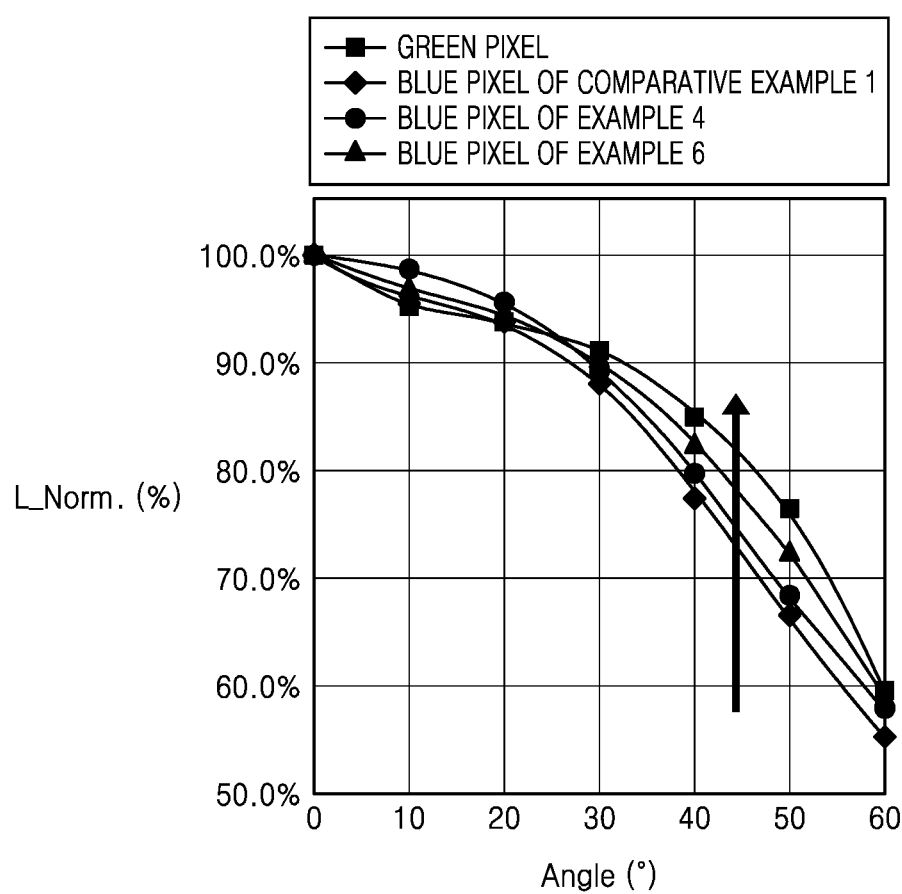
FIG. 4 is a graph of measurements showing that lateral luminance of a display apparatus according to an embodiment is improved.

The viewing angle of the display apparatus of each of Comparative Example 2 and Examples 4 to 6 was measured and the result is shown in FIG. 4 (in the case of the green pixels of Comparative Example 2 and Examples 4 to 6, the viewing angles were the same). Referring to FIG. 4, the y-axis represents normalized luminance, and the x-axis represents the viewing angle (0 degree is the front view).

Referring to FIG. 4, it can be seen that the viewing angle of the blue pixel of the display apparatus of Example 4 is superior to that of the blue pixel of the display apparatus of Comparative Example 1. This is because the difference between the refractive index of the scattering layer 230W and the refractive index of the low refractive index layer 260 is not large, and even when the incident angle is large at the boundary with the low refractive index layer 260, total reflection is reduced and light emitted to the front is increased (Since the inorganic capping layer 270 is very thin (for example, about 4000 Å), the inorganic capping layer 270 has little effect on the propagation of light).

On the other hand, it can be seen that the viewing angle of the blue pixel of the display apparatus of Example 6 is superior to that of the blue pixel of the display apparatus of Example 4, and this is because the surface of the scatterer and/or $SiO_2$ particles is coated with stearic acid, and then coated on the bank wall. This is because the bank with walls coated with scatterer and/or $SiO_2$ particles reflects or totally reflects the scattered light, so that the light absorbed onto the bank is decreased, and consequently more light is extracted and the scattering angle is increased.

The layer prepared according to an embodiment ink composition has the low refractive index of about 1.1 to about 1.5, so that the lateral luminance of the display apparatus including the same can be improved.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An ink composition comprising:
   a scatterer,
   a monomer, and
   a dispersant, wherein
   a layer formed using the ink composition has a refractive index of about 1.1 to about 1.5, and
   the dispersant comprises a polyacrylate-based compound containing a Si moiety, a polyurethane-based compound containing a Si moiety, a polyethylene-based compound containing a Si moiety, or any combination thereof.

2. The ink composition of claim 1, wherein the polyacrylate-based compound containing a Si moiety, the polyurethane-based compound containing a Si moiety, or the polyethylene-based compound containing a Si moiety comprises a carboxyl group and/or an amine group.

3. The ink composition of claim 1, wherein the monomer is an acrylate-based monomer that includes a Si moiety, the monomer complying with Formula 1 below:

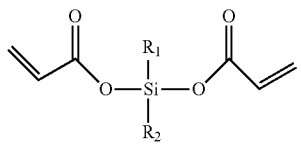

Formula 1 wherein, $R_1$ and $R_2$ are each independently be hydrogen, deuterium, a $C_1$-$C_{60}$ alkyl group unsubstituted or substituted with at least one $R_{10a}$, a $C_2$-$C_{60}$ alkenyl group unsubstituted or substituted with at least one $R_{10a}$, a $C_2$-$C_{60}$ alkynyl group unsubstituted or substituted with at least one $R_{10a}$, a $C_1$-$C_{60}$ alkoxy group unsubstituted or substituted with at least one $R_{10a}$, a $C_3$-$C_{60}$ carbocyclic group unsubstituted or substituted with at least one $R_{10a}$, or a $C_1$-$C_{60}$ heterocyclic group unsubstituted or substituted with at least one $R_{10a}$.

4. The ink composition of claim 1, wherein a vapor pressure of the ink composition is from about $10^{-6}$ mmHg to about $10^{-3}$ mmHg.

5. The ink composition of claim 1, wherein a surface energy of the ink composition is from about 1 dyne/cm to about 20 dyne/cm.

6. The ink composition of claim 1, wherein a viscosity of the ink composition is from about 1 cps to about 40 cps.

7. The ink composition of claim 1, wherein the ink composition does not contain a solvent.

8. The ink composition of claim 1, wherein the scatterer comprises a metal oxide, a non-metal oxide, or any combination thereof.

9. The ink composition of claim 1, wherein the scatterer comprises an oxide of titanium, silver, aluminum, or any combination thereof.

10. The ink composition of claim 1, wherein the ink composition further comprises particles having a refractive index of about 1.1 to about 1.5.

11. The ink composition of claim 10, wherein the particles comprise $SiO_2$ particles, $MgF_2$ particles, or any combination thereof.

12. The ink composition of claim 1, further comprising:
    particles having a refractive index of about 1.1 to about 1.5; and
    a compound having a carboxyl group and/or an amine group, wherein
    the scatterer and/or the particles are surface-treated with a compound having a carboxyl group and/or an amine group.

13. A display apparatus comprising:
    a first substrate on which a plurality of light-emitting devices are located;
    a plurality of light control members corresponding to the plurality of light-emitting devices disposed on the first substrate; and
    a plurality of banks arranged between the plurality of light control members, wherein
    at least one of the light control members includes a layer formed using an ink composition that includes a scatterer, a monomer, and a dispersant,
    the layer has a refractive index of about 1.1 to about 1.5, and
    the dispersant comprises a polyacrylate-based compound containing a Si moiety a polyurethane-based compound containing a Si moiety, a polyethylene-based compound containing a Si moiety, or any combination thereof.

14. The display apparatus of claim 13, wherein the light control members comprise a color filter layer, a quantum dot layer, a scattering layer, or any combination thereof.

15. The display apparatus of claim 13, further comprising:
    a low-refractive-index layer having a refractive index about 1.1 to about 1.5, wherein
    the low-refractive-index layer and the layer formed using the ink composition are adjacent to each other.

16. The display apparatus of claim 13, further comprising an inorganic capping layer.

17. The display apparatus of claim 13, further comprising:
    a low-refractive-index layer having a refractive index of about 1.1 to about 1.5; and
    an inorganic capping layer, wherein
    the inorganic capping layer is in direct contact with the low-refractive-index layer, and
    the inorganic capping layer is in direct contact with the layer formed using the ink composition.

18. The display apparatus of claim 13, wherein the ink composition further comprises a compound having a carboxyl group and/or an amine group, and
- a surface of the scatterer is surface-treated with the compound having a carboxyl group and/or an amine group, and adsorbed onto a surface of at least one of the banks.

19. The display apparatus of claim 13, wherein the ink composition further includes:
- a compound having a carboxyl group and/or an amine group; and
- particles having a refractive index of about 1.1 to about 1.5, and
- the scatterer and/or the particles are surface-treated with the compound having a carboxyl group and/or an amine group, and adsorbed onto a surface of at least one of the banks.

* * * * *